(12) United States Patent
Kitagawa

(10) Patent No.: US 10,940,415 B2
(45) Date of Patent: Mar. 9, 2021

(54) ELECTRET AND ELECTRET FILTER

(71) Applicant: TOYOBO CO., LTD., Osaka (JP)

(72) Inventor: Yoshiyuki Kitagawa, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 329 days.

(21) Appl. No.: 15/764,546

(22) PCT Filed: Sep. 21, 2016

(86) PCT No.: PCT/JP2016/077885
§ 371 (c)(1),
(2) Date: Mar. 29, 2018

(87) PCT Pub. No.: WO2017/057148
PCT Pub. Date: Apr. 6, 2017

(65) Prior Publication Data
US 2018/0272259 A1    Sep. 27, 2018

(30) Foreign Application Priority Data

Oct. 2, 2015  (JP) .............................. JP2015-197215
Oct. 2, 2015  (JP) .............................. JP2015-197216

(51) Int. Cl.
*B01D 39/16* (2006.01)
*B03C 3/28* (2006.01)
(Continued)

(52) U.S. Cl.
CPC ............ *B01D 39/1623* (2013.01); *B03C 3/28* (2013.01); *B03C 3/45* (2013.01); *B03C 3/64* (2013.01);
(Continued)

(58) Field of Classification Search
CPC combination set(s) only.
See application file for complete search history.

(56) References Cited

U.S. PATENT DOCUMENTS 3,986,851 A * 10/1976 Grodek .............. B01D 39/1623
                                                      55/488
4,877,433 A * 10/1989 Oshitari ............... B01D 39/083
                                                      55/486
(Continued)

FOREIGN PATENT DOCUMENTS

JP        5-214 A      1/1993
JP      7-290660 A    11/1995
(Continued)

OTHER PUBLICATIONS

Office Action dated Sep. 4, 2019, issued in counterpart CN Application No. 201680057111.3, with English translation. (13 pages).
(Continued)

*Primary Examiner* — Christopher P Jones
*Assistant Examiner* — Sonji Turner
(74) *Attorney, Agent, or Firm* — Westerman, Hattori, Daniels & Adrian, LLP

(57) ABSTRACT

An electret is disclosed including: a carrier, and polytetrafluoroethylene having a melting point of 35° C. or higher and 320° C. or lower deposited on the carrier, wherein the electret imparts an electrostatic charge to at least one of the carrier and the polytetrafluoroethylene, and has two or more melting point peaks in simultaneous thermogravimetry and differential thermal analysis. An electret filter is disclosed which preferably is used for a filter which requires durability to tobacco smoke. An electret filter is also disclosed having a fluorine-containing component deposited on a fiber surface, wherein an initial QF value is 0.5 mmAq$^{-1}$ or more in collection efficiency of particles having a particle diameter of 0.3 to 0.5 μm at a wind speed of 5 cm/s, and a filter deterioration rate by tobacco smoke loading is −8/(g/m$^2$) or more.

2 Claims, 1 Drawing Sheet

(51) Int. Cl.
| | |
|---|---|
| *B03C 3/45* | (2006.01) |
| *B03C 3/64* | (2006.01) |
| *D06M 13/08* | (2006.01) |
| *D06M 15/277* | (2006.01) |
| *D06M 15/256* | (2006.01) |
| *D06M 10/02* | (2006.01) |
| *D06M 10/08* | (2006.01) |
| *D06N 3/00* | (2006.01) |
| *D06N 3/04* | (2006.01) |

(52) U.S. Cl.
CPC .......... *D06M 10/025* (2013.01); *D06M 10/08* (2013.01); *D06M 13/08* (2013.01); *D06M 15/256* (2013.01); *D06M 15/277* (2013.01); *D06N 3/0011* (2013.01); *D06N 3/0084* (2013.01); *D06N 3/0088* (2013.01); *D06N 3/047* (2013.01); *B01D 2239/0421* (2013.01); *B01D 2239/0435* (2013.01); *B01D 2239/0478* (2013.01); *B01D 2239/0618* (2013.01); *B01D 2239/0622* (2013.01); *B01D 2239/1233* (2013.01); *B01D 2239/1291* (2013.01); *D06N 2201/0254* (2013.01); *D06N 2209/121* (2013.01); *D06N 2211/30* (2013.01)

(56) References Cited

U.S. PATENT DOCUMENTS

| | | | | |
|---|---|---|---|---|
| 4,948,515 | A * | 8/1990 | Okumura | H01G 7/023 204/560 |
| 5,304,227 | A | 4/1994 | Matsuura et al. | |
| 5,462,586 | A * | 10/1995 | Sugiyama | B01D 39/083 96/13 |
| 5,721,283 | A * | 2/1998 | Howard, Jr. | D01F 6/12 521/60 |
| 6,068,799 | A * | 5/2000 | Rousseau | B01D 39/1623 264/6 |
| 6,214,094 | B1 | 4/2001 | Rousseau et al. | |
| 6,238,466 | B1 | 5/2001 | Rousseau et al. | |
| 6,239,223 | B1 * | 5/2001 | Effenberger | C08L 27/12 523/200 |
| 6,261,342 | B1 | 7/2001 | Rousseau et al. | |
| 6,627,563 | B1 * | 9/2003 | Huberty | B01D 39/1623 442/91 |
| 10,213,716 | B2 * | 2/2019 | Kitagawa | D06M 15/256 |
| 2002/0005116 | A1 * | 1/2002 | Hagglund | B03C 3/28 95/79 |
| 2002/0174869 | A1 | 11/2002 | Gahan et al. | |
| 2006/0159973 | A1 | 7/2006 | Kotera et al. | |
| 2006/0205864 | A1 | 9/2006 | Yamamoto et al. | |
| 2006/0243138 | A1 | 11/2006 | Spartz et al. | |
| 2009/0214924 | A1 | 8/2009 | Kotera et al. | |
| 2009/0272084 | A1 * | 11/2009 | Healey | B01D 39/1623 55/487 |
| 2010/0269464 | A1 * | 10/2010 | Mori | B01D 69/12 55/486 |
| 2011/0105686 | A1 | 5/2011 | Kashiwagi | |
| 2011/0114555 | A1 | 5/2011 | Coulson et al. | |
| 2011/0135871 | A1 | 6/2011 | Yamamoto et al. | |
| 2011/0306716 | A1 | 12/2011 | Harvey et al. | |
| 2013/0047856 | A1 * | 2/2013 | Takeuchi | A62B 23/025 96/17 |
| 2013/0139691 | A1 * | 6/2013 | Goldbach | B01D 46/0032 96/15 |
| 2013/0283744 | A1 * | 10/2013 | Nakamura | C08J 7/0427 55/524 |
| 2014/0023895 | A1 * | 1/2014 | Ikeyama | B01D 69/02 429/82 |
| 2015/0024216 | A1 | 1/2015 | Usami | |
| 2015/0217220 | A1 * | 8/2015 | Ikeyama | B01D 46/543 55/486 |
| 2017/0113170 | A1 * | 4/2017 | Kitagawa | B01D 46/0032 |

FOREIGN PATENT DOCUMENTS

| | | | |
|---|---|---|---|
| JP | 8-281030 A | | 10/1996 |
| JP | 08281030 A | * | 10/1996 |
| JP | 2002-266219 A | | 9/2002 |
| JP | 2003-505229 A | | 2/2003 |
| JP | 2004-533313 A | | 11/2004 |
| JP | 2004-352976 A | | 12/2004 |
| JP | 2007-18995 A | | 1/2007 |
| JP | 2008-540856 A | | 11/2008 |
| JP | 2009-6313 A | | 1/2009 |
| JP | 2011-524799 A | | 9/2011 |
| JP | 2012236188 A | * | 12/2012 ........... C08F 220/36 |
| JP | 2013-34941 A | | 2/2013 |
| JP | 2013034941 A | * | 2/2013 |
| JP | 2013-514435 A | | 4/2013 |
| JP | 2013-166859 A | | 8/2013 |
| JP | 2014-226628 A | | 12/2014 |
| JP | 2014226628 A | * | 12/2014 |
| JP | 2015-85232 A | | 5/2015 |
| JP | 2015085232 A | * | 5/2015 |
| WO | 2009/104699 A1 | | 8/2009 |
| WO | 2015/152207 A1 | | 10/2015 |

OTHER PUBLICATIONS

International Search Report dated Dec. 27, 2016, issued in Counterpart of International Application No. PCT/JP2016/077885 (5 pages).

Office Action dated May 7, 2019, issued in counterpart JP Application No. 2015-197215, with English translation. (6 pages).

Office Action dated Mar. 3, 2020, issued in counterpart JP Application No. 2015-197215, with English Translation. (6 pages).

* cited by examiner

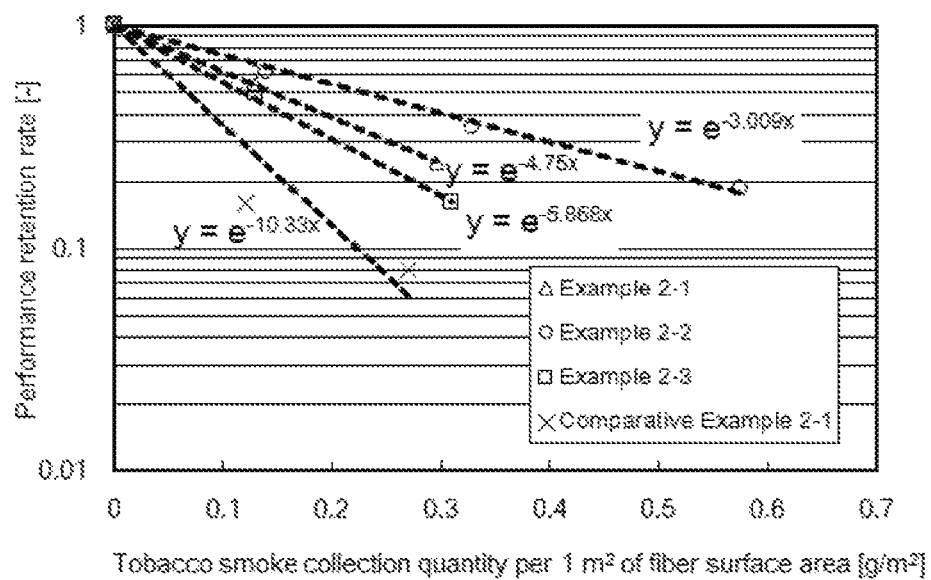

ELECTRET AND ELECTRET FILTER

TECHNICAL FIELD

The present invention relates to an electret and an electret filter.

BACKGROUND ART

Conventionally, in dust respirators, various types of air conditioning elements, air cleaners, cabin filters, and various types of apparatuses, porous filters have been used for purposes of dust collection, protection, ventilation, and the like.

Among the porous filters, filters made of fibrous materials have high porosity and have advantages such as long life and low ventilation resistance, and have therefore been widely used. These filters made of fibrous materials collect particles on fibers by mechanical collecting mechanisms such as blocking, contact deposition, diffusion, and inertial impaction, and have been known to have the minimum value of collection efficiency of the filter when the particles have an aerodynamic equivalent particle diameter of about 0.1 to 1.0 μm in practical application environments.

To improve the collection efficiency of the filter at the above-mentioned minimum value, a method of using electric attraction in combination is known. For example, a method employed may be a method for imparting an electric charge to object particles to be collected, a method for imparting an electric charge to a filter, or a combination of both of them. For examples of the method for imparting an electrostatic charge to a filter, there is known a method of disposing a filter between electrodes and causing dielectric polarization at the time of ventilation, and a method for imparting a long life electrostatic charge to an insulating material. Particularly, the latter technique has widely been employed for an electret filter since there is no need to use energy such as an external power source.

<Problem 1>

For electret filters, to increase initial collection efficiency and also to suppress performance decrease due to attenuation of electrostatic charge at the time of processing or preserving filters, electret materials capable of being electretized and excellent in moisture-proof stability and heat-resistant stability are used.

However, electret filters have a disadvantage of decrease of electrostatic attraction caused by collection of particles, and especially, oil mist that has low surface tension markedly accelerates elimination of electric charge by thinly coating the fiber surfaces. For common electret filters, polyolefins, polyesters, polycarbonates, phenol resins, and the like, that are excellent in electric charge stability are used. However, even fibrous materials of polyolefins such as polypropylene, polyethylene, and polymethylpentene with smallest surface tension among these materials do not exhibit sufficient oil repellency as a material characteristic against oil mist represented by poly-α-olefins (PAO), dioctyl phthalate (DOP), tobacco smoke, and the like. Therefore, there is a problem that collection efficiency retention capacity at the time the oil mist is loaded (hereinafter, referred to as "oil mist resistance") is low.

To solve such a problem, there is known a method of imparting oil repellency to the filter by lowering surface tension of a fibrous material composing the filter, and improving the oil mist resistance by suppressing spread of mist on the fiber surface and absorption and diffusion of mist in the inside of the fibrous material and thereby decreasing elimination of electric charge. Specifically, electrets employed are those having lowered surface tension and heightened oil mist resistance while retaining electric charge stability by a method of mixing an additive having a perfluoro group to the inside of resin to increase oil repellency (for example, Patent Document 1), a method of melt-spinning a thermoplastic fluororesin (for example, Patent Document 2 and Patent Document 3), a method of coating a surface with an emulsion processing agent containing a perfluoro group (for example, Patent Document 4), a method of introducing fluorine atoms by replacing hydrogen atoms using plasma, a fluorine gas and the like (for example, Patent Document 5), and the like.

Hereinafter, lowering surface tension of a material will be described as "oil repellency," and an effect of suppressing decrease in efficiency against oil mist will be described as "oil mist resistance." The oil repellency mentioned in the present invention means the effect of suppressing spread of a liquid by lowering surface tension, and in consideration of the principle of wetting, the oil repellency also encompasses the action against water with high surface tension value (water repellency).

However, a fluorine-based resin or a fluorine-based low molecular weight additive is unsuitable for melt spinning, since dissociation of fluoro-telomers and production of hydrogen fluoride and carbonyl fluoride as thermal decomposition products occur in environments exceeding 320° C. In addition, in the case of fluorine atom introduction by fluorine gas or a plasma treatment, in order to prevent fluorine gas leakage and suppress hydrophilization, it is necessary to strictly control the oxygen and water amounts, and special facilities with high air tightness are accordingly required. Further, because of an issue of bioaccumulation, use of perfluorooctanoic acid (PFOA), perfluorooctanesulfonic acid (PFOS) and salts thereof, as well as use of mother materials for producing telomers and production of the materials are inhibited. Thus, processes in which these materials are added, fluorine-hydrogen exchange randomly occurs, or thermal decomposition or oxidation decomposition occurs are not preferable.

Further, a method of coating with polytetrafluoroethylene by sputtering is also known, but flying particles unevenly exist on a porous carrier on the outermost layer of the vapor deposition source side, and at the same time, there is a possibility of shape change due to melting of a carrier, decomposition of polytetrafluoroethylene, or generation of oxidation products.

Further, a fluorine-containing acrylate-based processing agent, which is developed for textiles, contains an emulsifier or a film-forming auxiliary, and includes a short chain perfluoro group equal to or shorter than $C_6F_{13}$ as a side chain to comply with PFOA and PFOS regulations and therefore, the processing agent loses crystallinity. Thus, the processing agent itself has a problem that not only the agent does not have the stability of electrostatic charge but also the agent considerably inhibits electric charge stability of a fibrous material serving as a substrate even for a small amount of deposition.

Further, also known are fluorine-based resins which have solubility and thermoplasticity by being made amorphous, and have both electric charge stability and coating suitability (for example, Patent Document 6). However, these resins have a problem that it is required to use a special monomer as a main skeleton, and the production cost significantly increases accordingly.

<Problem 2>

An electret filter is known in main applications such as air conditioning elements for industrial use to control suspended dust particle concentration in office buildings, home air cleaners installed in general houses or small offices, local dust collectors arranged in smoking rooms or amusement apparatuses, and the like.

Particularly, a home air cleaner has a particle diameter distribution of particles which are difficult to collect with a fiber layer filter and uses tobacco smoke having a high filter deterioration rate as standard evaluation particles. This is defined according to the standards of Japanese Electronic Industry Association JEM 1467 (home air cleaner), Chinese national standard GB/T-18801, and CADR (Clean Air Delivery Rate) specified by American Home Appliance Manufacturers (AHAM). An air cleaner filter has a significant technical problem in improvement of collection efficiency and durability to tobacco smoke.

According to the domestic standards (JEM 1467) in Japan, the moment when the dust collection performance (=collection efficiency×air quantity) for tobacco smoke in a model test is reduced to half as compared with that when the electret filter is not used is regarded as life, and in the case where it is regarded to be equivalent to the air quantity, suppressing a decrease in collection efficiency for tobacco smoke significantly contributes to durability when used for an air cleaner.

Heretofore, a method of increasing a filtration area to reduce the tobacco smoke collection quantity per filter unit area, a method of increasing a filter layer to reduce the tobacco smoke collection quantity as well as to improve the collection efficiency, a method of using a filter having a mechanical collection efficiency alone of 50% due to improvement of fiber fineness, or the like has been employed. However, requirements from users or society such as making the air quantity large, reducing the size, saving energy, reducing noise, and prolonging useful life are increasing and conventional techniques are becoming difficult to support.

In addition, electret filters have a disadvantage of decrease of electrostatic attraction caused by collection of particles, and especially, oil mist that has low surface tension markedly accelerates elimination of electric charge by thinly coating the fiber surfaces. For common electret filters, polyolefins, polyesters, polycarbonates, phenol resins, and the like, that are excellent in electric charge stability are used. However, even fibrous materials of polyolefins such as polypropylene, polyethylene, and polymethylpentene with smallest surface tension among these materials do not exhibit sufficient oil repellency as a material characteristic against oil mist represented by poly-α-olefins (PAO), dioctyl phthalate (DOP), tobacco smoke, and the like. Therefore, there is a problem that collection efficiency retention capacity at the time the oil mist is loaded (hereinafter, referred to as "oil mist resistance") is low.

To solve such a problem, there is known a method of imparting oil repellency to the filter by lowering surface tension of a fibrous material composing the filter, and improving the oil mist resistance by suppressing spread of mist on the fiber surface and absorption and diffusion of mist in the inside of the fibrous material and thereby decreasing elimination of electric charge. Specifically, electrets employed are those having lowered surface tension and heightened oil mist resistance while retaining electric charge stability by a method of mixing an additive having a perfluoro group to the inside of resin to increase oil repellency (for example, Patent Document 1), a method of melt-spinning a thermoplastic fluororesin (for example, Patent Document 2 and Patent Document 3), a method of coating a surface with an emulsion processing agent containing a perfluoro group (for example, Patent Document 4), a method of introducing fluorine atoms by replacing hydrogen atoms using plasma, a fluorine gas and the like (for example, Patent Document 5), and the like.

Hereinafter, lowering surface tension of a material will be described as "oil repellency," and an effect of suppressing decrease in efficiency against oil mist will be described as "oil mist resistance." The oil repellency mentioned in the present invention means the effect of suppressing spread of a liquid by lowering surface tension, and in consideration of the principle of wetting, the oil repellency also encompasses the action against water with high surface tension value (water repellency).

However, a fluorine-based resin or a fluorine-based low molecular weight additive is unsuitable for melt spinning, since dissociation of fluoro-telomers and production of hydrogen fluoride and carbonyl fluoride as thermal decomposition products occur in environments exceeding 320° C. In addition, in the case of fluorine atom introduction by fluorine gas or a plasma treatment, in order to prevent fluorine gas leakage and suppress hydrophilization, it is necessary to strictly control the oxygen and water amounts, and special facilities with high air tightness are accordingly required. Further, because of an issue of bioaccumulation, use of PFOA (perfluorooctanoic acid), PFOS (perfluorooctanesulfonic acid) and salts thereof, as well as use of mother materials for producing telomers and production of the materials are inhibited. Thus, processes in which these materials are added, fluorine-hydrogen exchange randomly occurs, or thermal decomposition or oxidation decomposition occurs are not preferable.

In addition, a method of coating with polytetrafluoroethylene (PTFE) by a sputtering method is also known, but flying particles unevenly exist on the outermost layer of the vapor deposition source side, and at the same time, there is a possibility of decomposition of PTFE or generation of oxidation products.

Further, a fluorine-containing acrylate-based processing agent, which is developed for textiles, contains an emulsifier or a film-forming auxiliary, and includes a short chain perfluoro group equal to or shorter than $C_6F_{13}$ as a side chain to comply with PFOA and PFOS regulations and therefore, the processing agent loses crystallinity. Thus, the processing agent itself has a problem that not only the agent does not have the stability of electrostatic charge but also the agent considerably inhibits electric charge stability of a fibrous material serving as a substrate even for a small amount of deposition.

PRIOR ART DOCUMENTS

Patent Documents

Patent Document 1: JP-A-2009-6313
Patent Document 2: JP-A-2002-266219
Patent Document 3: JP-A-2007-18995
Patent Document 4: JP-A-2004-352976
Patent Document 5: JP-T-2008-540856
Patent Document 6: WO 2009/104699

SUMMARY OF THE INVENTION

Problems to be Solved by the Invention

An electret of the first invention solves problems that conventional electrets having oil mist resistance are largely restricted in terms of production facilities and cost, and that it is difficult to simultaneously satisfy both of electric charge stability and oil repellency in the case where short chain perfluoro compounds that comply with environmental regulations are used. The first invention thus aims to provide an electret producible by a simple technique at a low cost and excellent in oil repellency, oil mist resistance, electric charge stability, and collection efficiency after heat treatment (specifically, collection efficiency after heat treatment to collection efficiency before heat treatment (hereinafter referred to as "performance retention rate after heat treatment")).

The present invention provides an electret filter of the second invention preferably used for a filter which requires durability to tobacco smoke (for example, air cleaners used in houses and vehicles, dust collectors in smoking rooms and amusement apparatuses, and the like).

Solutions to the Problems

To solve the problems, the present inventors made keen investigations against problem 1 and finally completed the first invention. That is, the first invention is as follows.

1. An electret comprising: a carrier, and polytetrafluoroethylene having a melting point of 35° C. or higher and 320° C. or lower deposited on the carrier, wherein the electret imparts an electrostatic charge to at least one of the carrier and the polytetrafluoroethylene, and has two or more melting point peaks in simultaneous thermogravimetry and differential thermal analysis.

2. The electret according to the above 1, wherein the carrier is a fibrous material and polytetrafluoroethylene is deposited on the carrier by a vapor deposition method.

3. The electret according to the above 1 or 2, wherein the carrier is a melt-blown nonwoven fabric made of a thermoplastic resin having a melting point of 320° C. or lower.

4. A filter comprising the electret defined in any of the above 1 to 3.

The present inventors made keen investigations against problem 2 and finally completed the electret filter of the second invention. That is, the second invention is as follows.

5. An electret filter having a fluorine-containing component deposited on a fiber surface, wherein an initial Quality Factor (QF) value is 0.5 mm Aq$^{-1}$ or more (approximately 0.05 Pa$^{-1}$ or more) in collection efficiency of particles having a particle diameter of 0.3 to 0.5 µm at a wind speed of 5 cm/s, and a filter deterioration rate by tobacco smoke loading is $-8/(g/m^2)$ or more.

6. The electret filter according to the above 5, wherein the fiber has an effective fiber diameter of 0.1 µm to 20 µm.

Effect of the Invention

An electret of the first invention is excellent in oil repellency, oil mist resistance, electric charge stability, and performance retention rate after heat treatment without using PFOA, PFOS and analogous compounds thereof by simple apparatuses and processes, and the present invention makes it possible to provide a filter including the electret. Therefore, the filter including the electret is preferably usable as dust respirators, various types of air conditioning elements, air cleaners, cabin filters, and filters aimed at protecting various types of apparatuses.

Further, the present invention makes it possible to provide a filter of the second invention which is preferably used particularly for air cleaners and is excellent in durability to tobacco smoke.

BRIEF DESCRIPTION OF THE DRAWING

FIG. 1 is a graph showing the relationship between the tobacco smoke deposited quantity and the performance retention rate.

MODE FOR CARRYING OUT THE INVENTION

Hereinafter, specific examples of the present invention will be described, but optimum constitutions for every use may be selected in accordance with the purport of the present invention.

First, a first electret (hereinafter sometimes referred to as "the first invention") and a filter including the first electret will be described.

A carrier used in the first invention is not particularly limited as long as it has desired properties, but in consideration of freedom of shapes and charge stability of a material itself, a carrier made of a synthetic resin with high electric resistance is preferable. Specific examples include polyesters, polycarbonates, polyamides, polyolefins, cyclic olefins, poly(vinyl chloride), poly(vinylidene chloride), polyphenylene sulfides, polyphenylene oxides, phenol resins, and the like, which are non-fluorine-based synthetic resins. Among them, polyolefins such as polyethylene, polybutene, polypropylene, polymethylpentene, polystyrene, and cyclic olefins are preferable. In the case where the carrier is made of a polyolefin, an electret with good balance of hydrophobicity, electric resistance, formability, and the like and excellent in practical utility can be obtained. Further, the carrier is particularly preferably a thermoplastic resin having a melting point of 320° C. or lower. As the thermoplastic resin, any of the above-mentioned resins may be used. Among them, polyolefin having a melting point of 320° C. or lower is preferable, and polypropylene is further preferable.

Use of a synthetic resin containing fluorine atoms for a carrier is also preferable to further improve oil repellency, and examples thereof include polytetrafluoroethylene (PTFE), perfluoroethylene-propene copolymers (FEP), perfluoroalkoxyalkanes (PFA), ethylene-tetrafluoroethylene copolymers (ETFE), polychlorotrifluoroethylene (PCTFE), poly(vinylidene fluoride) (PVDF), tetrafluoroethylene-hexafluoropropylene-vinylidene fluoride copolymers (THV), and the like. In terms of oil repellency, PTFE, FEP, PFA, and ETFE are more preferable.

To suppress deterioration of resins themselves and further to improve the initial electric charge quantity and electric charge stability of an electret, conventionally known compounding agents and compounding compositions may be preferably used for the above-mentioned synthetic resins. Examples of the compounding agents may include various kinds of metal salts, antioxidants, photostabilizers, ionomer resins, or the like, and examples of the compounding compositions may include blended polymers, or the like obtained by mixing different resin components. In the case where the initial charge quantity and electric charge stability for an electret are considered, at least one is preferably a synthetic resin which can be electretized.

The first invention is an electret obtained by depositing PTFE having a melting point of 35° C. or higher and 320° C. or lower on a carrier. The form of the carrier may preferably be any of an injection-molded body, a film form, a fibrous material, a powdery material, and a granular material, and in the case of use for particle removal and ventilation, a fibrous material is more preferable.

The fibrous material in the first invention may encompass fibrous materials such as a woven fabric made of long fibers or short fibers, a nonwoven fabric, and a cotton material, and a fibrous material produced from a stretched film. Fibrous materials formed into a proper form with proper thickness depending on uses may be employed. In the case where an electret is used for a filter, a nonwoven fabric is preferable.

As a method of obtaining a nonwoven fabric, employable are conventionally known methods such as methods for forming sheets from single component fibers, composite fibers such as sheath-core fibers and side-by-side fibers, or short fibers such as divided fibers by carding, air-laying, wet paper making methods or the like, methods for forming sheets from continuous fibers by a spun-bonding method, a melt-blowing method, an electro-spinning method, a force-spinning method or the like. Especially, nonwoven fabrics obtained by a melt-blowing method, an electro-spinning method, or a force-spinning method which can easily obtain high density and fineness are preferable from the viewpoint of effective utilization of the mechanical collection mechanism, nonwoven fabrics obtained by a melt-blowing method, a melt-electro-spinning method, or a melt-force-spinning method are more preferable due to no necessity of treatment of a remaining solvent, nonwoven fabrics obtained by a melt-blowing method is particularly preferable, and a melt-blown nonwoven fabric made of a thermoplastic resin having a melting point of 320° C. or lower is most preferable.

The diameter (average fiber diameter) of fibers used for the fibrous material in the first invention is preferably 0.001 to 100 μm, more preferably 0.005 to 20 μm, further preferably 0.01 to 10 μm, particularly preferably 0.02 to 5 μm, and most preferably 0.03 to 3 μm. If the diameter of fibers is larger than 100 μm, it is difficult to obtain practical collection efficiency, and decrease of the efficiency at the time of electric charge attenuation is significant. If the diameter of fibers is smaller than 0.001 μm, it is difficult to impart an electrostatic charge as an electret.

The fibrous material in the first invention may be a uniform material made of a single material by a single production method, or a mixture made of two or more kinds of materials different in the production method, materials, and fiber diameter.

The first electret is obtained by depositing PTFE having a melting point of 35° C. or higher and 320° C. or lower on at least a portion of a carrier and imparting oil repellency. The melting point of the PTFE is preferably 60° C. or higher and 315° C. or lower, more preferably 80° C. or higher and 300° C. or lower, and further preferably 100° C. or higher and 290° C. or lower. If the melting point is within the above range, PTFE having molecular weight distribution may be used.

The reasons for using PTFE having the above-mentioned melting point in vapor deposition process include, for example, (1) deterioration of a carrier (particularly a synthetic polymer) and occurrence of a problem on heat resistance when the deposition processing temperature on a carrier is high because a general PTFE has a high melting point of 320° C. or higher, (2) low surface tension and a high oil repellency effect of low melting point PTFE (minimum surface tension 13 mN/m or more and less than 17.5 mN/m) used in the present invention, as compared with general PTFE (minimum surface tension 17.5 mN/m), due to the crystal form and $CF_3$ group terminal density, (3) development of the minimum surface tension (6 mN/m) of the $CF_3$ group in the molecules on the plane due to the ordered structure of crystalline molecules in the case where epitaxial growth from a substrate or a seed crystal is employed, (4) capability of a physical vapor deposition treatment (PVD treatment) by heating under normal pressure, reduced pressure, or a vacuum condition because of the melting point and boiling point within practically applicable temperature ranges, (5) an advantage in terms of PFOA and PFOS regulations, differing from a plasma treatment (carbonization-fluoridation) in which control of the molecular weight of deposition components and structure or a sputtering treatment is difficult, (6) suppression of the oil repellency fluctuation due to a change in molecular orientation because the PTFE is solid at normal temperature and has crystallinity, (7) self-adhesive property by heat treatment because the PTFE has a melting point, and (8) homogeneous surface treatment on a hydrophobic material used as a substrate for an electret as well without using a surfactant.

Examples of a method of depositing the PTFE used in the first invention on the carrier using the above-mentioned characteristics may include a method for fixation by transpiring PTFE at a temperature higher than or equal to the melting point and lower than or equal to the thermal decomposition temperature, cooling and solidifying the PTFE on a carrier, and carrying out heat treatment at a temperature higher than or equal to the melting point of the PTFE if necessary.

The PTFE used in the first invention has a melting point of 320° C. or lower, which is the thermal decomposition temperature, and is confirmed to have a clear evaporating and transpiring property at a temperature equal to or higher than the melting point. Accordingly, PTFE can be deposited on the carrier by a vapor deposition method. Regarding the melting point, for example, at normal pressure (1 atmospheric pressure in ambient air), the PTFE has a melting point of 36° C. in the case of $n-C_{10}F_{22}$; a melting point of 76° C. in the case of $n-C_{12}F_{26}$; a melting point of 103° C. in the case of $n-C_{14}F_{30}$; a melting point of 125° C. in the case of $n-C_{16}F_{34}$; a melting point of 167° C. in the case of $n-C_{20}F_{42}$; and a melting point of 219° C. in the case of $n-C_{31}F_{64}$.

The first electret has two or more melting point peaks derived from PTFE in simultaneous thermogravimetry and differential thermal analysis. That is, in the first invention, two or more kinds of PTFE are used, and two kinds of PTFE are preferably used. In the case of using two kinds of PTFE, the PTFEs are preferably mixed at a mass ratio of 30:70 to 70:30. Further, the PTFE used in the first invention may be commercially available, and low molecular weight PTFE Cefral Lube (registered trademark) V manufactured by Central Glass Co., Ltd., as a commercialized mixture, has a melting point in a range of 100 to 290° C. (peak temperature of 270° C.), so that it can be used as a vapor deposition source by heating at a temperature of 100° C. or higher. The PTFE is preferably used by heating at 290° C. or higher and 320° C. or lower at which it is entirely liquefied. The simultaneous thermogravimetry and differential thermal analysis will be described later.

Particularly, in the first invention, two or more kinds of PTFE are processed by a vapor deposition method, so that the PTFE processing over the entire thickness direction of the carrier taking advantage of a difference between the melting points or a difference between the diffusion speeds and the separation action per molecular weight can give crystals excellent in electric charge retention capacity and liquid repellency.

The PTFE exhibits stability as a solid at the time of use, has characteristics as a liquid and a gas at the time of being heated, and is thus preferably usable as a material for a physical vapor deposition method (PVD method). When heated at the thermal decomposition temperature or lower, the PTFE can maintain its structure, and accordingly has advantageous characteristics to a plasma treatment which produces fluoropolymers unstable in terms of molecular weight and structure, to a sputtering treatment, or to a thermal decomposition vapor deposition method at a high temperature using high molecular weight PTFE as a raw material.

A technique for vapor deposition process may be a method of heating tetrafluoroethylene with various kinds of heat sources to generate vapor and precipitating the fluorine-containing component in form of liquid droplets or crystals on the carrier surface held at a lower temperature. As such a technique, either a batch method of treating the entire surface to be processed at a time or a continuous method of continuously treating different surfaces of a carrier to be processed by moving the carrier or a reaction container may be preferably employed.

The vapor deposition process in the first invention may be carried out preferably under any of an elevated pressure, normal pressure, reduced pressure, vacuum state, pressure swing among these pressures, and in either an air atmosphere or an inert gas atmosphere.

It is made possible to improve the transpiration speed and lower the transpiration temperature by reducing the pressure or producing a vacuum state, and it is made possible to accelerate precipitation of transpired substances by pressurization. Further, producing a vacuum or inert atmosphere can suppress oxidation of PTFE or a carrier, but in the first invention, a low temperature treatment at the thermal decomposition temperature or lower is possible and therefore, an air atmosphere may be employed in terms of cost.

In the first invention, adjustment of the deposition conditions for PTFE makes it possible to achieve a preferable adhesion state depending on the purposes. Especially, in the case of a porous structure such as a fibrous material, PTFE which has a wide average free path of molecules unevenly exists on the carrier surface at the transpiration side when the degree of vacuum is high, and in the case of low vacuum, normal pressure, or elevated pressure, the uniformity can be improved owing to turning around of PTFE. To adjust the adhesion surface, pressure swing or a treatment of changing the surfaces (front surface and back surface) to be processed of a single carrier is also a preferable method.

In the present invention, at the time of vapor deposition process or after the vapor deposition process, a carrier is preferably treated at 40° C. or higher and 140° C. or lower, more preferably at 50° C. or higher and 140° C. or lower, and further preferably at 60° C. or higher and 140° C. or lower. This is because the treatment as described above improves adhesion to a carrier, causes a stabilization effect on an electret owing to removal of low molecular weight substances, and lessens VOC components which may be separated. Specifically, the adjustment can be carried out by decreasing or increasing a vapor deposition bath temperature and cooling or heating a carrier at the time of vapor deposition process, and heating can also be carried out after the vapor deposition process.

In the first invention, cooling solidification may be carried out after deposition in the vapor state, or deposition in form of liquids or solid particles after aggregation is also preferable. Depositing PTFE on the carrier surface in a manner of forming a finely uneven structure can improve oil repellency, and increase the total electric charge quantity and the surface area capable of collecting oil mist owing to the increase of the carrier surface area.

Also preferable is a method of simultaneously supplying high melting point PTFE, organic or inorganic particles, and other kinds of liquid, vapor or mist to serve as condensation cores to the atmosphere in which vapor of the PTFE exists.

The above-mentioned finely uneven structure is preferably finer than liquid droplets to be collected. This is because not only the wet work increases owing to the increase of the surface area, but also a highly oil-repellent surface in accordance with the Cassie-Baxter theory can be obtained owing to the existence of an air layer between the deposited particles and the carrier.

The first electret and a filter including the first electret are obtained by electretizing at least one of a carrier and PTFE and imparting an electrostatic charge thereto. An electretization method is not particularly limited as long as it can provide desired characteristics at the time of use, and may be employed either before deposition or after deposition of PTFE. The former is advantageous in terms of the adhesion and processing by attracting a PTFE powder due to electrostatic attraction, and the latter can cause a better electret effect since the electrical lines of force are not shielded.

As a specific electretization method, conventionally known methods based on electric action, such as a corona discharge method, polarization by high voltage, charged ion collision, and injection of charged particles, based on interaction with a solid by friction, collision, or the like, and based on utilization of contact and collision with a liquid can be preferably employed. More preferably, a method utilizing contact or friction with a liquid (for example, water) is more preferable in terms of oil repellency and oil mist resistance, since electretization is possible without increasing oxidation products having polarity.

Regarding the first electret, as compared with a non-electret having no electric charge (in a non-charged state), a performance increase rate, as described below, is preferably 400% or more, more preferably 800% or more, further preferably 900% or more, and most preferably 1000% or more. The upper limit of the performance increase rate is not particularly limited and is preferably 2000% or less.

The performance increase rate in a state before and after electric charge can be calculated from the collection efficiency for 0.3 to 0.5 μm dust at a wind speed of 10 cm/s. A method of calculating the performance increase rate will be described later in detail.

Performance increase rate [%]=100×[ln(1−[collection efficiency after electric charge (%)]/100)]/[ln(1−[collection efficiency with no charge (%)]/100)]

Regarding the first electret, as the electric charge stability required at the time of use and preservation of a filter and at the time of the forming process, a performance retention rate after heat treatment as described below is preferably 10% or more, more preferably 30% or more, further preferably 70% or more, particularly preferably 80% or more, and most preferably 90% or more. The upper limit of the performance retention rate after heat treatment is not particularly limited and is preferably 99% or less. The performance retention rate after heat treatment can be calculated from the collection efficiency for 0.3 to 0.5 μm dust at a wind speed of 10 cm/s before and after the electret is left standing still in an atmosphere of 80° C. for 30 minutes. A method of calculating the performance retention rate after heat treatment will be described later in detail.

Performance retention rate after heat treatment [%]=100×[ln(1−[collection efficiency after heat treatment (%)]/100)]/[ln(1−[collection efficiency after electric charge (%)]/100)]

Regarding the oil repellency obtained by the first invention, adjustment is possible depending on the characteristics required (for example, water-proofness, anti-fouling property, water-repelling property, and oil-repelling property). For example, in the case of use as a filter made of a fibrous material such as a nonwoven fabric or a woven fabric, a filter can be preferably used if the filter has oil repellency at least better than that of a non-processed product (for example, 36 mN/m as a representative value in a PP melt blown fabric) as represented by surface tension giving penetrability within 10 seconds in a surface tension test liquid employed in JIS K6768 and the AATCC118 method. Specifically, the surface tension of at least one surface is preferably 31 mN/m or less, more preferably 29 mN/m or less, further preferably 27 mN/m or less, and most preferably 25.4 mN/m or less. These values are defined in consideration of mineral and plant oil mist for practical use, on the basis of surface tensions of 31 mN/m to DOP, which is a test liquid for an oil mist national test for dust respirators, and 29 mN/m to PAO (for example, Emery 3004). According to the investigations by the present inventors, the oil repellency in form of a sheet and the oil resistance as a filter have a correlation, and if oil repellency sufficient for preventing absorption by capillarity is provided, the filter is confirmed to have clear oil mist resistance (suppression of decrease in efficiency). This is because the oil resistance (contact angle) of a material surface and the absorption phenomenon in a porous body have a correlation, and the oil resistance has a correlation with the contact angle and collection state of aerosol collected on the fiber surface at the time of a mist test. Further, the surface tension value of the tobacco smoke itself, which is a mixture, is unclear, but together with decrease of the penetrability with the above-mentioned liquid, a clear effect of improving durability can be confirmed.

In the case where the first electret is used as a filter, it is also preferable to stack a fiber layer having an oil-absorbing or water-absorbing function (hereinafter, referred to as "liquid-absorbing layer). Use of the liquid-absorbing layer having a liquid-absorbing function such as oil absorption and water absorption suppresses dripping of liquid droplets formed due to oil repellency, and transfers and diffuses the liquid droplets from the electret surface, so that loss of the electret property and increase of ventilation resistance can be suppressed.

A material for the liquid-absorbing layer is not particularly limited as long as it can absorb liquid droplets, and those preferably usable are fiber sheet materials made of polypropylene, polyethylene, polystyrene, polyamide, polyacrylonitrile, polyester, polycarbonate, cellulose, rayon, or the like, and sheet materials containing porous materials such as activated carbon, zeolite, and pulp in voids or surface-processed with the porous materials. Olefin-based materials such as polypropylene, polyethylene, and polystyrene or polyesters are more preferable, and polypropylene is further preferable.

It is preferable to use one kind or two or more kinds of fibers in combination for the liquid-absorbing layer, and proper materials can be selected from the viewpoints of ventilation resistance, collection of coarse particles, and the like.

A material to be preferably used as the liquid-absorbing layer may be either a non-electret or an electret, and is more preferably electretized.

A method of forming the liquid-absorbing layer is not particularly limited as long as it can give desired characteristics, and those usable are materials made into sheets by a preferable method such as a thermal bonding method, a spun-bonding method, a spun lace method, an electro-spinning method by a melting and solution method, as well as a force spinning method, or the like.

The diameter of fibers composing the liquid-absorbing layer is preferably 0.005 to 100 μm, more preferably 0.01 to 20 μm, further preferably 0.5 to 5 μm, and most preferably 1 to 10 μm.

Further, the layer can be used in combination with another constituent member if necessary. That is, combination use with a pre-filter layer, a fiber protection layer, a reinforcing member, or a functional fiber layer and the like is also preferable.

Examples of the pre-filter layer and the fiber protection layer may include spun bond nonwoven fabrics, thermal bond nonwoven fabrics, foamed urethane, and the like, and examples of the reinforcing member may include thermal bond nonwoven fabrics, various kinds of nets, and the like. Further, examples of the functional fiber layer may include colored fiber layers for antibacterial purposes, antivirus purposes, and purposes of identification or design. Imparting these functions to the liquid-absorbing layer is preferable as a method of decreasing the thickness and the ventilation resistance.

The first electret and a filter including the electret can be used widely owing to the functions such as dust collection, protection, ventilation, anti-fouling, water-proofness, and the like, and especially preferably usable as dust respirators, various types of air conditioning elements, air cleaners, cabin filters, and filters aimed at protection of various types of apparatuses.

Next, a second electret filter (hereinafter sometimes referred to as "the second invention") will be described.

The second electret filter has a fluorine-containing component deposited on a fiber surface and uses a fiber as a carrier. The second electret filter preferably contains a fiber layer made of fibers and fluorine-containing particles deposited on the surface of the fiber layer.

(Fiber Layer)

A constituent material of the fiber layer is not particularly limited as long as it has desired characteristics, and a synthetic resin is preferably used in terms of freedom of shapes, and a synthetic resin not containing fluorine is more preferably used. Examples of the synthetic resin not containing fluorine include polyesters, polycarbonates, polyamides, polyolefins, cyclic olefins, poly(vinyl chloride), and poly(vinylidene chloride). Among them, polyolefin materials such as polyethylene, polypropylene, polybutene, polymethylpentene, and cyclic olefins or polystyrene materials are preferable. Use of these materials can provide an electret filter with high electric resistance and good balance of hydrophobicity, formability, and the like, and excellent in collection efficiency of particles having a particle diameter of 0.3 to 0.5 μm (hereinafter sometimes simply referred to as "collection efficiency"), that is, excellent in practical utility.

Use of a synthetic resin containing fluorine atoms for a carrier is also possible to further improve durability to tobacco smoke, and examples include polytetrafluoroethylene, perfluoroethylene-propene copolymers (FEP), perfluoroalkoxyalkanes (PFA), ethylene-tetrafluoroethylene copolymers (ETFE), polychlorotrifluoroethylene (PCTFE), poly(vinylidene fluoride) (PVDF), tetrafluoroethylene-hexafluorop ropylene-vinylidene fluoride copolymers (THV), and the like. In terms of durability to tobacco smoke, polytetrafluoroethylene, FEP, PFA, and ETFE are more preferable.

The fiber layer used in the second invention may be a layer in which a fibrous material such as a woven fabric, a nonwoven fabric, and a cotton material produced by a known method is molded into a proper form and thickness, and in a filled state depending on uses. A fiber layer of a nonwoven fabric is preferable in terms of particle removal performance. A method of forming a fiber layer of a nonwoven fabric is not particularly limited, and examples thereof include known methods such as a melt-blowing method, a wet method, a dry method, a spun-bonding method, a flash spinning method, an electro-spinning method, a force-spinning method, an ultrasonic stretching method, a composite fiber dividing method, and the like. In the second invention, a melt-blowing method, an electro-spinning method, a force-spinning method, or an ultrasonic stretching method is preferably adopted because the nonwoven fabric thus obtained has a small fiber diameter and good collection efficiency. Further, a melt-blowing method, a melt-electro-spinning method, a melt-force-spinning method or an ultrasonic stretching method is preferably adopted in terms of no necessity of treatment of a remaining solvent. The fiber layer may be molded of only one kind of material or of two or more kinds of materials.

The fibers used in the second invention have an effective fiber diameter of preferably 0.1 to 20 µm, more preferably 0.15 to 15 µm, further preferably 0.2 to 10 µm, particularly preferably 0.3 to 5 µm, and most preferably 0.5 to 3 µm. The effective fiber diameter of the fibers is calculated according to a method specified in Davies, C. N., "The Separation of Airborne Dust and Particles", Institution of Mechanical Engineers, London, Proceedings 1B, 1952. If the effective fiber diameter of the fibers is within the above range, ventilation resistance of air in the fiber layer can be decreased while the collection efficiency is increased. If the effective fiber diameter of the fibers is larger than 20 µm, the collection efficiency may decrease and decrease in efficiency of various performances at the time of electric charge attenuation is significant. If the effective fiber diameter of the fibers is smaller than 0.1 µm, ventilation resistance becomes excessively high at the time of using fibers in an amount to maintain strength or uniformity, so that it is difficult to use the fibers for air cleaners in which the fibers are sucked with a small sirocco fan having a large air quantity and static pressure.

The cross-sectional shape of the fiber may be circular or may be a modified cross-section such as an ellipse, a rectangle, a star, or a clover. In the modified cross-section fiber, a liquid having a contact angle formed with the fiber surface of 90° or less is absorbed in a groove of the fiber by capillarity, so that coverage of the entire fiber with a liquid can be suppressed, which in turn can suppress decrease in electret property.

The fibrous material in the second invention may be a uniform material made of a single material by a single production method, or a mixture made of two or more kinds of materials different in the production method, materials, and fiber diameter.

To suppress deterioration of resins themselves and to improve electric charge stability in the fiber layer, known compounding agents may be added to the resins. Examples of the compounding agents may include various kinds of metal salts, antioxidants, photostabilizers, and the like. Further, to suppress deterioration of resins themselves and to improve electric charge stability in the fiber layer, a plurality of different materials may be used to form the fiber layer. For example, compatible or non-compatible blended polymers obtained by mixing two or more different resin components, ionomer resins, maleic acid-modified polyolefin resins, hindered phenol-based resins, hindered amine-based resins, or the like may be used.

(Fluorine-Containing Component)

The second electret filter has characteristics such that, to impart water repellency and oil repellency, a fluorine-containing component containing fluorine atoms is deposited on at least a portion of the fiber surface. A fluorine-containing material is composed of a fluorine-containing polycyclic compound or a fluorine-containing polymer obtained from monomer components containing fluorine-containing olefins or (meth)acrylate having fluorine-containing side chains. From the viewpoint of avoiding environments or human bodies from being adversely affected, it is preferable that the above fluorine-containing polymer and the above fluorine-containing polycyclic compound are hydrolyzed not to produce fluoro-telomers having 8 or more carbon atoms and in which all the hydrogens are substituted by carbons.

As the deposition state of the fluorine-containing component on the fiber surface, specifically a state where a substantially uniform coating layer of the fluorine-containing material is formed on the fiber surface, a state where the fiber surface has protrusions and recesses due to the coating layer and at least one of them is made of the fluorine-containing material, and a state where the fiber surface has protrusions and recesses due to the coating layer and both of them are made of the fluorine-containing material can be exemplified.

Specific examples of creating the unevenness may include (1) a method of previously producing a smooth fluorine-containing surface and then depositing a component to be protruded; (2) a method of mixing two or more components having different melting points or glass transition temperatures and having different solubilities with a coating solution and forming unevenness due to the difference in solubility; (3) a method of using an emulsion or a suspension as a coating solution and subjecting a component having a low melting point or glass transition temperature to heat treatment to thereby form a smooth surface; (4) a method of previously forming a protruding component on a carrier surface and then depositing a solution thereon; (5) a method of previously forming a protruding component on a carrier surface and then depositing a component having a low melting point or glass transition temperature thereon to form a smooth surface by heat treatment; and (6) a method of depositing a material which is more oxidation-resistant or sputtering-resistant than a carrier, on a surface and then etching the carrier side.

In the above, examples of the method of previously producing a smooth fluorine-containing surface include (1) a method of mixing a fluorine-containing component with a carrier component; (2) a method of fluorinating a carrier by fluorine gas; (3) a method of fluorinating a carrier by fluorine plasma; (4) a method of producing a fluorine-containing resin layer on a carrier surface by surface polymerization; (5) a method of coating a carrier surface with a solution of a fluorine-containing component; (6) a method of depositing an emulsion or a suspension of a fluorine-containing component and then forming a smooth surface by heat treatment; (7) a method of depositing a granular material of a fluorine-containing component in vapor phase and then forming a smooth surface by heat treatment; and (8) a method of vapor depositing a fluorine-containing component to form a smooth surface. Among them, the (5) to (8) methods are preferable.

In the above, examples of the method of depositing the component to be protruded on the fluorine-containing plane that has previously been processed include (1) a method of applying an emulsion, a suspension, or the like as a coating solution; (2) a method of spraying an emulsion, a suspension, a solution, or the like with a spray to thereby be granulated; and (3) a method of precipitating out of vapor or liquid droplets on a surface by transpiration or sublimation.

In the above, examples of the method of previously forming a protrusion include (1) a method of applying etching treatment to a carrier; (2) a method of depositing two or more components and removing at least one of the components due to the difference in solubility or vapor pressure; (3) a method of previously mixing a protruding component with a resin component of a carrier; (4) a method of spraying an emulsion, a suspension, a solution, or the like with a spray to thereby be granulated; and (5) a method of precipitating out of vapor or liquid droplets on a surface by transpiration or sublimation.

A technique for vapor deposition process of the above-mentioned fluorine-containing component to be employed may be a method of heating the fluorine-containing component with various kinds of heat sources to generate vapor and precipitating the fluorine-containing component in form of liquid droplets or crystals on the carrier surface held at a lower temperature. As such a technique, either a batch method of treating the entire surface to be processed at a time or a continuous method of continuously treating different surfaces of a carrier to be processed by moving the carrier or a reaction container may be preferably employed.

The vapor deposition process in the second invention may be carried out preferably under any of an elevated pressure, normal pressure, reduced pressure, vacuum state, pressure swing among these pressures, and in either an air atmosphere or an inert gas atmosphere.

It is made possible to improve the transpiration speed and lower the transpiration temperature by reducing the pressure or producing a vacuum state, and it is made possible to accelerate precipitation of transpired substances by pressurization. Further, producing a vacuum or inert atmosphere can suppress oxidation of a fluorine-containing component or a carrier, but in the second invention, a low temperature treatment at the thermal decomposition temperature or lower is possible and therefore, an air atmosphere may be employed in terms of cost.

The fluorine-containing component is preferably not a particle coating metal and metal oxide, and is preferably not a mixture with metal and metal oxide from the viewpoints of electric charge stability and oil mist resistance. The metal and the metal oxide are contained in an amount of preferably 10% by mass or less, more preferably 5% by mass or less, more preferably 0% by mass (not containing the metal and the metal oxide), in 100% by mass of the fluorine-containing component.

When a fluorine-based coating layer is used to prepare a fluorine-containing component on a surface of the metal or metal oxide, the following problems occur: (1) It may be difficult to apply a uniform coating onto the surface of the metal oxide, resulting in difficulty in exhibiting oil repellency to fine liquid droplets. (2) In a compound utilizing reactivity with the metal, a $C_6$ or less single linear compound has viscosity at normal temperature and electric charge stability of an electric filter or deposition and dispersion of particles are inhibited. (3) Reactivity against tobacco smoke or resistance to hydrolysis of acid and basic substances is inferior.

The fluorine-containing component may preferably contain or not contain a small amount of surfactant. Specifically, the surfactant is contained in an amount of preferably 25% by mass or less, more preferably 10% by mass or less, more preferably 0% by mass (not containing the surfactant), in 100% by mass of the fluorine-containing component. Particles containing the surfactant beyond the above range may inhibit water repellency and oil repellency or electric charge stability of the particles themselves or the substrate.

In the fluorine-containing polycyclic compound, a fluorine substitution rate of hydrogen atoms is preferably 80% or more, more preferably 90% or more, most preferably 95% or more, from the viewpoints of electric charge stability and oil repellency. Further, the fluorine-containing polycyclic compound has a melting point of preferably 40° C. or higher, more preferably 60° C. or higher, further preferably 80° C. or higher, and most preferably 100° C. or higher, from the viewpoints of electric charge stability and oil repellency. As specific substances, fluorinated graphite, fluorinated fullerene, fluorinated carbon nanotube and the like are preferable in the case of a three-dimensional structure, and a fluorinated graphene is preferable in the case of a planar structure.

The fluorine-containing polymer has a melting point or a glass transition temperature of preferably 40° C. or higher, more preferably 60° C. or higher, further preferably 80° C. or higher, and most preferably 100° C. or higher. This is because the fluorine-containing polymer has the following effects: (1) Since the viscosity of an emulsion or a suspension is lowered, blocking of particles in the dispersion is reduced. (2) The fluidity of the fluorine-containing polymer lowers, so that elimination of electric charge due to spread of the fluorine-containing polymer on the fiber after the electret processing can be suppressed. (3) Since molecular motility of the fluorine-containing polymer is low, the fluorine-containing polymer itself is electretized, so that deterioration at the time of adding oil mist is further suppressed. (4) Processing of the fluorine-containing polymer improves the rigidity and heat-setting property of the fiber, so that the filter becomes excellent in pleat processability and wind resistance. (5) Blocking between filters or between a filter and a packaging material or the like at the time of the molding process and at the time of preservation of a filter can be suppressed, and contamination of processing machines or molds can be reduced. Examples of the fluorine-containing polymer include PTFE, FEP, PFA, ETFE, PCTFE, PVDF, THV, (meth)acrylic acid polymer having a $C_7$ or less (preferably $C_6$ or less) perfluoro structure at least in a side chain, and modified PTFE having solubility in a fluorine solvent. A method for measuring a melting point and a glass transition temperature will be described later.

In particular, as for the fluorine-containing (meth)acrylic acid polymer, in order to increase a glass transition temperature in the case of random polymerization, introduction of a halogen atom into a main chain of the polymer; copolymerization of the polymer with a monomer such as rigid short chain methylmethacrylate, trifluoromethylmethacrylate, styrene-containing olefin having a large steric hindrance, dicyclopentenyl group-containing olefin, or dicyclopentanyl group-containing olefin; and exhibiting crystallinity due to introduction of stereoregular polymerization are preferable methods.

Specific examples of the fluorine-containing (meth)acrylic acid polymer include a (co)polymer including a fluorine-containing olefin. Specific examples of the fluorine-containing (meth)acrylic acid include a (co)polymer containing (meth)acrylate having a fluoroalkyl group in a side chain.

The fluorine-containing olefin preferably has a perfluoroalkyl group and/or a perfluoroalkylene group from the viewpoint of oil repellency. The fluorine-containing olefin is preferably used when the perfluoro group has 1 or more and 7 or less carbon atoms, and the fluorine-containing olefin more preferably has a perfluoroalkyl group of 4 to 6 carbon atoms at the ends of the side chains. The fluorine-containing (meth)acrylate preferably has a (meth)acryloyl group where a trifluoromethyl group is located at the end.

The fluorine-containing polymer may contain oxygen, silicon, nitrogen atom, and the like as linking groups, and more preferably has a structure of only hydrogen, fluorine, and carbon. In the case of having such a structure, the fluorine-containing polymer does not have unpaired atoms and asymmetric polar component, so that surface tension and hygroscopicity are reduced and as a result, oil mist resistance and electret property are improved.

The fluorine-containing polymer preferably has at least one aromatic hydrocarbon group, linear, branched, and cyclic aliphatic hydrocarbon groups as a spacer with a main chain. In the case where α-chloro(meth)acrylate is used as the main chain, it is possible to incorporate a chlorine atom having a large steric hindrance into the main chain, so that the fluorine-containing polymer can obtain a high glass transition temperature as a polymer while maintaining a high content ratio of a fluorine-containing monomer, and the electric charge stability and oil repellency can be easily improved.

In the case where a monomer having a short chain fluorine-containing alkyl group or fluorine-containing alkylene group is used, (meth)acrylate having a linear aliphatic hydrocarbon group of 12 to 30 carbon atoms is preferably used as a monomer to be copolymerized with these fluorine-containing monomers in order to obtain a desired glass transition temperature or crystallinity, and examples thereof include lauryl (meth)acrylate, myristyl (meth)acrylate, cetyl (meth)acrylate, stearyl (meth)acrylate, and behenyl (meth)acrylate. The use of (meth)acrylate having a long chain aliphatic hydrocarbon group contributes to higher crystallinity of the side chain of the copolymer and to improvement of the glass transition temperature of the copolymer. In addition to this, in order to shield an ester group and to reduce molecular motility, stability of the electret property is improved.

As the monomer to be copolymerized with the fluorine-containing monomer, (meth)acrylates having a branched aliphatic hydrocarbon group, a cyclic aliphatic hydrocarbon group, and an aromatic hydrocarbon group may be used. Specific examples thereof include (meth)acrylates having cycloalkyl group such as a cyclohexyl group; polycyclic aliphatic hydrocarbon group of 7 to 20 carbon atoms such as a norbornyl group, a bornyl group, an isobornyl group, or an adamantyl group; and aromatic hydrocarbon group such as a phenyl group, a naphthyl group, or a benzyl group. These (meth)acrylates have large steric hindrance, so that they provide a higher melting point or glass transition temperature, and further shield an ester group and reduce molecular motility, so that stability of the electret property is improved. Examples of the above-mentioned (meth)acrylate include cyclohexyl (meth)acrylate, isobornyl (meth)acrylate, bornyl (meth)acrylate, adamantyl (meth)acrylate, dicyclopentanyl (meth)acrylate, dicyclopentenyl (meth)acrylate, tricyclodecanyl (meth)acrylate, phenyl (meth)acrylate, naphtyl (meth)acrylate, benzyl (meth)acrylate, and 2-t-butylphenyl (meth)acrylate.

Among them, dicyclopentanyl acrylate (homopolymer Tg=120° C.), dicyclopentanyl methacrylate (homopolymer Tg=175° C.), isobornyl acrylate (homopolymer Tg=94° C.), and isobornyl methacrylate (homopolymer Tg=180° C.) are more preferable. A homopolymer having a cyclic aliphatic hydrocarbon group is characterized as having a remarkably higher glass transition temperature than a homopolymer having a linear aliphatic hydrocarbon group, so that the fluorine-containing polymer can obtain a high glass transition temperature as a polymer while maintaining a high content ratio of a fluorine-containing monomer.

As the monomer to be copolymerized with the fluorine-containing monomer, halogen-free olefins having a branched aliphatic hydrocarbon group, a cyclic aliphatic hydrocarbon group, and an aromatic hydrocarbon group may be used, and examples thereof include styrene (homopolymer Tg=100° C.). Styrene has a large steric hindrance as an aromatic ring and is made of only a hydrocarbon structure having a small amount of a polar component, so that the glass transition temperature of the copolymer increases and the hygroscopicity of the copolymer is reduced, and as a result, stability of the electret property is improved.

As other monomers, a halogenated olefin, a functional group having crosslinkability, a non-fluorine-based monomer having a hindered phenol structure or a hindered amine structure that imparts an antioxidative action and electric charge stability may be used. The halogenated olefin is preferably used as long as it has two or more carbon atoms, and examples thereof include vinyl chloride, vinyl bromide, vinyl iodide, vinylidene chloride, vinylidene bromide, and vinylidene iodide. A halogenated vinyl such as vinyl chloride (homopolymer Tg=87° C.) is preferably used in terms of improvement of glass transition temperature.

The copolymerization ratio of the fluorine-containing monomer to the non-fluorine-based monomer is in the range of preferably 100:0 to 10:90, more preferably 100:0 to 20:80, and even more preferably 100:0 to 30:70 in terms of molar ratios.

Further, in the case of depositing particles on the surface to form unevenness, fluorine-containing particles having a particle diameter of 0.1 nm or more and 500 nm or less are preferably deposited on a carrier. The particle diameter is more preferably 0.5 nm or more and 300 nm or less, further preferably 1 nm or more and 200 nm or less, and most preferably 2 nm or more and 100 nm or less. In the case where the particle diameter is more than 500 nm, uniformity of the particle diameter at the time of dispersion is less obtained and the thickness of the coating is likely to be excessively large, so that handling becomes difficult. A suspended oil mist to be collected is usually 500 nm or less, so that it is difficult to impart oil repellency due to unevenness. On the other hand, when the particle diameter is less than 0.1 nm, the particles are not suitable for coating in terms of solubility and melting point or vapor pressure, which may deteriorate oil repellency, durability and stability, and electret stability.

Especially, when the carrier is a fibrous material and employed in applications requiring air permeability and filtration characteristics, a ratio of the fibrous material diameter to the particle diameter is important. A value obtained by dividing a fiber diameter by a particle diameter (fiber diameter/particle diameter) is preferably 1 or more, more preferably 10 or more, and most preferably 100 or more. Further, it is generally known that the smaller the fiber diameter, the more the filtration characteristics (collection efficiency per unit ventilation resistance) improve, and increase of the fiber diameter due to the coating layer is suppressed.

Examples of techniques for adjusting the above-mentioned particle diameter may include (1) a method for adjusting the particle diameter at the time of polymerization by emulsion polymerization and suspension polymerization; (2) a method for pulverizing fluorine-containing polymers by physical action such as impact or friction; (3) a method for granulation by dissolving fluorine-containing polymers in a fluorine-based solvent, supercritical carbon dioxide, and the like and then spraying the dissolved polymers onto a carrier; (4) a method for granulation by dissolving fluorine-containing polymers in a fluorine-based solvent, supercritical carbon dioxide, and the like and then mixing the dissolved polymers with a poor solvent, followed by reprecipitation; (5) a method for spraying a carrier after heating to a temperature higher than a melting point; and (6) a method for utilizing transpiration and condensation due to changes in pressure and temperature. A preferable technique may be selected according to the intended particle diameter. In the case of particles obtained by emulsion polymerization, suspension polymerization, or reprecipitation, the particles may be deposited on a carrier in the form of a solid-liquid mixture, or the particles may be obtained after a drying step. The fluorine-containing polymer can be prepared by a known method using the above-mentioned monomers.

The method for pulverization by physical action can be executed by using various types of pulverizers of either wet type or dry type. Specifically, for example, a ball mill, a bead mill, a jet mill, a homogenizer, and the like can be used, and these pulverizers can be used for pulverization simultaneously with emulsification and suspension.

In the case of dispersion in a liquid, examples of a preferably usable dispersant may include water, hydrocarbon-based organic solvents, halogen-based organic solvents, and the like, and two or more kinds of dispersants can be used in form of a mixture. In the case where an organic solvent is used as a dispersant, the penetration property and uniformity of coating can be enhanced owing to the affinity with the synthetic resin used as a carrier. In the case where water is used as a dispersant, various kinds of surfactants may be used. Since the surfactant hinders development of oil repellency and stability of the electret, it is preferably finally eliminated from the fluorine-containing components and/or inactivated. Examples of the method that may be used include a method of transpiring the surfactant by heat treatment before or after deposition to a carrier, a method of eliminating the surfactant from the fluorine-containing components by thermal decomposition or oxidation decomposition, a method of eliminating the surfactant from the fluorine-containing components by washing with water or a solvent, and a method of blocking ionic functional groups with a transition metal ion or a reactive organic substance. As a method of dispersing the fluorine-containing components without using the surfactant, a fluorine-containing solvent may be preferably used in the dispersant as well.

As the method for granulation by spraying, an airless or compressed-air spraying method, an ultrasonic atomization spraying method, a Laskin nozzle spraying method, a collision spraying method, an electrostatic spraying method or the like can be exemplified. In such a case, using a solution or a suspension which is previously granulated, a particle diameter in proportion to the concentration of the solution can be easily adjusted. Particularly, as a technique for obtaining monodisperse particles having a diameter of 0.1 nm or more and 500 nm or less, a method of spraying a solution or a suspension is preferable, and the particles may be deposited in any of a solution state, a half-transpired state, and a solid state.

As the method for granulation by transpiration, a method of vaporizing a fluorine-containing material by heating or reducing pressure and then precipitating the vaporized material directly on a carrier surface by cooling or pressurizing, or a method of granulating a fluorine-containing material in air and then depositing the granulated material on a carrier surface may be used.

The second invention includes a step (vapor phase method) of depositing a fluorine-containing component on a carrier using a vapor phase in which the fluorine-containing component is dispersed. In the case where the carrier is used for a filter, if particles are deposited on the carrier by the vapor phase method, the fluorine-containing component can be processed without using a surfactant, and the particle collection characteristics of the carrier itself can be exploited.

(Electretization)

The second electret filter is obtained by electretizing at least one of a carrier and a fluorine-containing component and imparting an electrostatic charge thereto. An electretization method is not particularly limited as long as it can provide desired characteristics at the time of use, and may be employed either before deposition or after deposition of the fluorine-containing component. The former is advantageous in terms of the adhesion and processing by attracting a fluorine-containing powder due to electrostatic attraction, and the latter can cause a better electret effect since the electrical lines of force of a carrier are not shielded.

As the electretization method, known methods based on electric action, such as polarization by high voltage, charged ion collision, and injection of charged particles, based on interaction with a solid by friction, collision, or the like, and based on utilization of contact and collision with a liquid can be preferably employed. A method utilizing contact or friction with a liquid is more preferable in terms of oil repellency and oil mist resistance. The use of this method enables electretization without increasing oxidation products having polarity, so that the method is more preferable in terms of tobacco smoke durability.

Regarding the second electret filter, the collection efficiency (initial collection efficiency) of particles having a particle diameter of 0.3 to 0.5 μm at a wind speed of 5 cm/s is preferably 50% or more, more preferably 70% or more, further preferably 90% or more, and most preferably 99% or more. The number of particles having particle diameters of 0.3 to 0.5 μm before and after passage through the filter is determined and the initial collection efficiency is calculated by the following equation.

Initial collection efficiency (%)=(1−(number of particles after passage through filter/number of particles before passage through filter))×100

Regarding the second electret filter, the initial QF value of the particles having a particle diameter of 0.3 to 0.5 μm at a wind speed of 5 cm/s is 0.5 mmAq$^{-1}$ or more (approximately 0.05 Pa$^{-1}$ or more), preferably 1.0 mmAq$^{-1}$ or more (approximate 0.10 Pa$^{-1}$ or more), and more preferably 1.5 mmAq$^{-1}$ or more (approximately 0.15 Pa$^{-1}$ or more). The initial QF value is calculated by the following equation using values of ventilation resistance (pressure loss by passage through the filter) and the above-mentioned initial collection efficiency.

Initial QF value(mmAq$^{-1}$)=−[ln(1−[initial collection efficiency (%)]/100)]/[ventilation resistance(mmAq)]

Regarding the degree of oil repellency of the second electret filter, liquid droplets of a test liquid used in the AATCC-118 method and a liquid mixture for wetting tension test used in JIS K 6768 are added dropwise, and a smaller surface tension required for penetration provides a higher degree of oil repellency. Regarding the degree of oil repellency of the second electret filter, adjustment is possible depending on the characteristics required (for example, water-proofness, anti-fouling property, water-repelling property, and oil-repelling property). A filter can be preferably used if the filter has at least lower degree of oil repellency than that of a non-processed product (for example, 36 mN/m as a surface tension of polypropylene obtained by a melt-blowing method) as represented by test liquid surface tension giving penetrability within 30 seconds in a test liquid employed in the AATCC118 method and a liquid mixture for wetting tension test employed in JIS K 6768. Specifically, the surface tension is more preferably 31 mN/m or less, further preferably 29 mN/m or less, particularly preferably 27 mN/m or less, and most preferably 25 mN/m or less. These values are defined in consideration of mineral and plant oil mist for practical use, on the basis of surface tensions of 31 mN/m to bis(2-ethylhexyl) phthalate (DOP), which is a reference of liquid particles for national test standards for dust respirators, and 29 mN/m to Emery 3004 as one of poly-α-olefin (PAO). According to the investigations by the present inventors, the oil repellency in form of a sheet and the oil mist resistance when used as a filter have a correlation, and if oil repellency sufficient for preventing absorption by capillarity is provided, the filter has satisfactory oil mist resistance (suppression of decrease in collection efficiency). This is because the oil mist resistance (contact angle) of a material surface and the absorption phenomenon in a porous body have a correlation, and when the filter has sufficient oil repellency, capillarity can suppress coverage of the entire fiber with a liquid, which in turn can suppress decrease in electret property. The degree of oil repellency has a correlation with the contact angle and collection state of aerosol collected on the fiber surface at the time of a mist test. Further, the surface tension value of the tobacco smoke, which is a mixture, is unclear, but together with decrease of the penetrability with the above-mentioned liquid, durability is remarkably improved.

To compare the second electret filter with a filter generally used for an air cleaner, an indicator of the tobacco smoke durability is standardized by the following technique.

(1) Four cigarettes of MEVIUS (registered trademark) manufactured by Japan Tobacco Inc. were burned in a 1 m$^3$ acrylic container with a smoke filter by a technique according to JEM1467 method.

(2) A filter (sample) punched into 72 mm φ is attached to an adapter having an effective ventilation diameter of 50 mm p, and circulation ventilation is carried out at an air quantity of 12 L/min for 10 minutes.

(3) The particle concentration is decreased from 4000 CPM to 3000 CPM by a digital dust indicator P-2L manufactured by Sibata Scientific Technology Ltd. In the case where the efficiency is maintained at 100%, four cigarettes of MEVIUS (registered trademark) are burned and ventilation is carried out at an air quantity of 12 L/min for 10 minutes, so that the collection quantity is approximately 1 cigarette/cycle.

(4) In the initial period (before cycle loading) and at the end of one cycle (four cigarettes of MEVIUS (registered trademark) are burned and ventilation is carried out at an air quantity of 12 L/min for 10 minutes), the collection efficiency of particles having a particle diameter of 0.3 to 0.5 µm and the collection mass of the tobacco smoke are measured, and the cycle and the measurement are repeated until the performance retention rate decreases less than 15%.

(5) The effective fiber diameter (µm) of fibers is calculated according to the Davies method.

(6) A fiber surface area (m$^2$/m$^2$) per 1 m$^2$ of a sample is calculated with the effective fiber diameter obtained in the above (5).

(7) ln (initial permeability) (=ln(1−[initial collection efficiency (%)]/100)) is calculated from the initial collection efficiency of the filter, and then ln (permeability at cycle end) (=ln(1−[collection efficiency at cycle end (%)]/100)) is calculated from the collection efficiency (collection efficiency at cycle end) of particles having a particle diameter of 0.3 to 0.5 µm at the end of the cycle immediately before the cycle in which the performance retention rate becomes less than 15%. Then, ln (permeability at cycle end)/ln (initial permeability) is determined as the performance retention rate.

(8) A tobacco smoke collection quantity per 1 m$^2$ of the filter is calculated by dividing the tobacco smoke collection quantity obtained in the above (4) by an adaptor passing area of 50 mm φ, and a tobacco smoke collection quantity per 1 m$^2$ of the fiber surface area is calculated by dividing the tobacco smoke collection quantity per 1 m$^2$ of the filter by the fiber surface area obtained in the above (6).

(9) A semilogarithmic graph is plotted with the tobacco smoke deposited quantity (mg/m$^2$) per 1 m$^2$ of the fiber surface area (ordinary axis) as abscissae and the performance retention rate (logarithmic axis) as ordinates. The inclination of the graph descending toward the right is determined as a filter deterioration rate. Specifically, regarding the logarithmic axis, an interval (for example, an interval between 0.1 and 1) where the performance retention rate is 10 times is determined as 1 (no unit), the calculated inclination (unit: 1/(g/m$^2$)) is determined as a filter deterioration rate. A specific method of calculating the inclination will be described later.

The calculation of the thickness and the filter deterioration rate refers to characteristics of a practically uniform electret layer alone which contributes to collection performance or durability. In the case where a reinforcing layer and a plurality of electret layers having different finenesses are stacked, at least one layer needs to have a performance of the second electret filter.

Regarding the second electret filter, in terms of the electric charge stability required at the time of preservation of a filter and at the time of the forming process, the performance retention rate as described below is preferably 10% or more, more preferably 30% or more, further preferably 70% or more, particularly preferably 80% or more, and most preferably 90% or more. The collection efficiency at the cycle end uses a value of the collection efficiency of particles having a particle diameter of 0.3 to 0.5 µm at the end of the cycle immediately before the cycle in which the performance retention rate becomes less than 15% (at the end of two cycles, in the case where the performance retention rate is less than 15% at the end of two cycles).

Performance retention rate [%]=100×[ln(1−[collection efficiency at cycle end (%)]/100)]/[ln(1−[initial collection efficiency (%)]/100)]

According to the verification by the present inventors, the above-mentioned filter deterioration rate (hereinafter simply referred to as "deterioration rate" in some cases) of the polypropylene fibers obtained by a general melt-blowing method is approximately −9/(g/m$^2$). However, the deterioration rate can be suppressed to −8/(g/m$^2$) or higher by using the second electret filter, preferably $-6/(g/m^2)$ or higher, more preferably $-5/(g/m^2)$ or higher, and preferably $-2/(g/m^2)$ or less. It means that, for example, when a filter having a deterioration rate of $-9/(g/m^2)$ and a filter having a deterioration rate of $-3/(g/m^2)$ are compared, the filter having a deterioration rate of $-3/(g/m^2)$ is deteriorated similarly to the filter having a deterioration rate of $-9/(g/m^2)$ (their collection efficiencies become equal to each other) by three times the tobacco smoke loading of the filter having a deterioration rate of $-9/(g/m^2)$. In the electret filter produced by a method of coating the filter with a fluorine-containing component by a vapor deposition method, the deterioration rate is likely to be suppressed.

(Other Layers)

The second electret filter preferably uses a fiber layer having an oil-absorbing or water-absorbing function (hereinafter, referred to as "liquid-absorbing layer") to be additionally stacked. In the case where a non-fluorine-based material is used as a carrier, the second electret filter has an oil-absorbing function even though a general-purpose resin such as polyethylene or polypropylene is stacked on the filter. Use of the liquid-absorbing layer having a liquid-absorbing function such as oil absorption and water absorption suppresses dripping of liquid droplets formed due to oil repellency, and transfers and diffuses the liquid droplets from the electret filter surface to the liquid-absorbing layer, so that loss of the electret property and increase of ventilation resistance can be suppressed.

A material for the liquid-absorbing layer is not particularly limited as long as it can absorb liquid droplets, and preferable are fiber sheet materials made of polypropylene, polyethylene, polystyrene, polyamide, polyacrylonitrile, polyester, polycarbonate, cellulose, rayon, or the like, and sheet materials containing porous materials such as activated carbon, zeolite, and pulp in voids or surface-processed with the porous materials. Fiber sheet materials made of olefin-based materials such as polypropylene, polyethylene, and polystyrene or polyesters are more preferable, and fiber sheet materials made of polypropylene are further preferable.

The diameter of fibers composing the liquid-absorbing layer is preferably 0.005 to 100 μm, more preferably 0.01 to 20 μm, further preferably 0.5 to 10 μm, and most preferably 1 to 5 μm.

It is possible to use one kind or two or more kinds of fibers in combination for the liquid-absorbing layer, and materials can be selected from the viewpoints of collection of coarse particles, ventilation resistance, and the like.

A material to be used as the liquid-absorbing layer may be either a non-electret material or an electret material, and is preferably an electret material.

A method of forming the liquid-absorbing layer is not particularly limited as long as it can give desired characteristics, and the liquid-absorbing layer can be formed using materials made into sheets by a method such as a thermal bonding method, a spun-bonding method, a spun lace method, a melt electro-spinning method, a solution electro-spinning method, a force spinning method, or the like.

Further, the second electret filter can be used in combination with a layer such as a pre-filter layer, a fiber protection layer, a functional fiber layer, or a reinforcing layer if necessary. These layers may be a layer composed by depositing the fluorine-containing polymer used in the second invention.

Examples of the pre-filter layer and the fiber protection layer may include spun bond nonwoven fabrics, thermal bond nonwoven fabrics, foamed urethane, and the like, Further, examples of the functional fiber layer may include colored fiber layers for antibacterial purposes, antivirus purposes, and purposes of identification or design. Examples of the reinforcing layer include thermal bond nonwoven fabrics, various kinds of nets, or the like. Imparting these functions to the liquid-absorbing layer is also preferable as a method of decreasing the thickness and the ventilation resistance.

The second electret filter can be used widely owing to the functions such as dust collection, protection, ventilation, anti-fouling, and water-proofness. The second electret filter is preferably usable as, for example, dust respirators, various types of air conditioning elements, air cleaners, cabin filters, and filters aimed at protection of various types of apparatuses, and especially preferably usable for air cleaners that mainly collect tobacco smoke, air conditioning elements, and the like.

This application claims priority to Japanese Patent Applications No. 2015-197215 and No. 2015-197216, filed on Oct. 2, 2015. The teachings of these applications are all incorporated by reference herein in their entirety.

EXAMPLES

Hereinafter, the present invention is described in more detail by Examples, but the present invention is by no means limited to the following Examples. The present invention can be suitably modified in the range adaptable to the spirit described above and below, and any of the modifications are included in the technical scope of the present invention.

Example 1

Examples of the above-mentioned first invention will be described hereinbelow. Testing methods will be described below.

(1) Melting Point

Using a simultaneous thermogravimetric analyzer STA7300 manufactured by Hitachi High-Tech Science Corporation, 10 mg of a nonwoven fabric sample in which PTFE was deposited on a surface was analyzed under the conditions of a temperature raising rate of 10° C./min under a nitrogen atmosphere, and the resulting peak temperature was determined as a melting point. The melting point of PTFE was determined as reduction of the mass after the peak, a melting behavior of the polypropylene nonwoven fabric used as a substrate, and a difference from the reduction of the mass of such fabric.

(2) Degree of Oil Repellency with JIS K 6768 Wetting Tension Test Liquid

Fifteen kinds of wetting tension test liquids having a surface tension in the range of 40 to 26 mN/m were adjusted at an interval of 1 mN/m in accordance with the compounding defined in JIS K 6768, and a wetting tension test liquid having a surface tension of 25.4 mN/m was separately adjusted to prepare 16 kinds of wetting tension test liquids. Then, a test liquid having a surface tension of 40 mN/m was used to be left stand still in an amount of each 50 μL to each test sample surface by a micropipette for a microbial test, and the penetration degree was observed after 10 seconds. Thereafter, the penetration degrees of test liquids having surface tensions of 39 mN/m, 38 mN/m, 37 mN/m, . . . , 27 mN/m, 26 mN/m, 25.4 mN/m in order were observed in the same manner as above, and the surface tension of a test liquid having the minimum surface tension, which was not completely absorbed, was determined as a degree of oil repellency of the wetting tension test liquid defined in JIS K 6768. As a result of the sequential measurements, in the case where there was a difference between the front surface and the back surface of the test material, the lower surface tension was determined as the degree of oil repellency (the same applies to the other subsequent measurements of the degree of oil repellency). In the case where the test liquid having a surface tension of 25.4 mN/m was non-penetrative, the test result was defined as 25.4 mN/m because there was no test liquid which was penetrative.

(3) Degree of Oil Repellency Defined in AATCC 118

Test liquids of first grade to eighth grade defined in the AATCC 118 method were prepared. Each test liquid was left stand still in an amount of each 50 μL to each test sample surface by a micropipette for a microbial test, and the penetration degree was observed after 30 seconds. A grade corresponding to the highest numbered test liquid that was not completely absorbed into the test material was determined as a degree of oil repellency in the AATCC 118 method. In the case where the first-grade test liquid was penetrative, the test result was defined as 0 grade because there was no test liquid which was non-penetrative. Further, in the case where the eighth-grade test liquid was non-penetrative, the test result was defined as the eighth grade because there was no test liquid which was penetrative.

(4) Oil Repellency to PAO

Emery 3004 (PAO (poly-α-olefin)) was prepared as a test liquid. PAO was left stand still in an amount of 50 μL to a test sample surface by a micropipette for a microbial test, and the penetration degree was observed after 30 seconds. In the case where the test liquid was penetrative, the result was defined as x, and in the case where the test liquid was non-penetrative, the result was defined as ○. Further, in the case where the test liquid was not completely absorbed into the test sample, it was determined as oil repellent to PAO (non-penetrative).

(5) Durability to Oil Mist

A test of load resistance to oil mist (durability to oil mist) was carried out by the following two methods. The test was carried out using PAO mist as mineral particles with low polarity, and the test was also carried out using tobacco smoke as composite particles containing water and various types of polar molecules.

(5-1) Durability Test to Oil Mist (PAO Durability)

Each sample punched into 72 mm φ was attached to an adapter having an effective ventilation diameter of 50 mm φ, and ventilation was carried out under the following conditions using Certitest Model 8130 manufactured by TSI Inc. Particle loading was performed continuously, and a particle collection quantity on the sample at the moment when the particle collection efficiency obtained by the following calculation method reached 50% (the particle concentration after passage through the filter was half the particle concentration before passage through the filter) was defined as durability value (PAO durability life).

Evaluation particles: Emery 3004 (PAO) in equilibrium charged state Modal particle diameter 0.184 μm Ventilation speed: 5 cm/sec (6 L/min)

Concentration: 100 mg/m$^3$

Calculation of efficiency: Evaluation of concentration before and after passage through the filter by a light scattering concentration method It was confirmed that the collection efficiency of particles having a particle diameter of 0.3 to 0.5 μm by a light scattering concentration method was almost coincident with the collection efficiency of those particles measured with a light scattering calculation device.

(5-2) Durability Test to Oil Mist (Tobacco Smoke Durability)

[Tobacco Smoke Loading]

Four cigarettes of MEVIUS (registered trademark) manufactured by Japan Tobacco Inc. were burned in a 1 m$^3$ acrylic container with a smoke filter by a technique according to JEM1467 method. Each sample punched into 72 mm φ was attached to an adapter having an effective ventilation diameter of 50 mm φ, and ventilation was carried out at an air quantity of 12 L/min for 10 minutes. The particle concentration was decreased from 4000 CPM to 3000 CPM by a digital dust indicator P-2L manufactured by Sibata Scientific Technology Ltd. In the case where the efficiency was maintained at 100%, four cigarettes of MEVIUS (registered trademark) were burned and ventilation was carried out at an air quantity of 12 L/min for 10 minutes, so that the load quantity was approximately 1 cigarette/cycle.

[Measurement Method of Collection Efficiency at the Time of Tobacco Smoke Loading]

For each loading of the above-mentioned 1 cycle (four cigarettes of MEVIUS (registered trademark) were burned and ventilation was carried out at an air quantity of 12 L/min for 10 minutes), each sample punched into 72 mm φ was attached to an adapter having an effective ventilation diameter of 50 mm φ, and using Certitest Model 8130 manufactured by TSI Inc., the efficiency and the mass were measured by the following method. The cycle was repeated until the efficiency became less than 50% and such a moment was defined as an end point. The collection efficiency and the collected mass of tobacco smoke were plotted in the axis of ordinates and the axis of abscissas as ordinal axes, and the numerical value of the collected mass of tobacco smoke at the moment when the efficiency reached 50% was calculated as a tobacco smoke durability life.

Evaluation particles: Solid NaCl (generated from 2% by mass of NaCl solution) in equilibrium charged state Modal particle diameter 0.075 μm Ventilation speed: 5 cm/sec (6 L/min)

Concentration: 200 mg/m$^3$

Calculation of efficiency: Evaluation of concentration before and after passage through the filter by a light scattering concentration method In the case where a sample after tobacco smoke loading was used, efficiency evaluation was carried out by a light scattering concentration method because a light scattering counter caused interference in the particle diameter measurement. Since the particle concentration did not reach equilibrium for 4 seconds by a conventional method, the value of 20 seconds was set as the time taken for the upper and lower detectors to be equilibrium, and the numerical value in the filter tester mode of 1 cycle (efficiency measurement mode) was employed.

(6) Collection Efficiency on Electretized Filter

A particle collection efficiency test was carried out with a sample (filter) described in (7) and (8) below, by the following method using a light scattering type particle counter KC-01E manufactured by Rion Co., Ltd.

Evaluation particles: Airborne dust

Ventilation speed: 10 cm/sec

Calculation of efficiency: The number of particles having particle diameters of 0.3 to 0.5 μm before and after passage through the filter was measured and the collection efficiency was calculated by the following equation.

Collection efficiency (%)=(1−(number of particles after passage through filter/number of particles before passage through filter))×100

(7) Collection Efficiency after Electric Charge and Performance Increase Rate

Each sheet sample after fluorine processing was subjected to an electric charging (electretizing) treatment. The collection efficiency of the charged particles having a particle diameter of 0.3 to 0.5 μm (hereinafter referred to as "collection efficiency after electric charge") was measured by the method described in above (6). Next, the sheet was impregnated with an aqueous 0.5% perfluoroalkyl group-containing carboxylic acid solution containing MegaFac F410 (manufactured by DIC Co., Ltd.) and dried to be brought into a state where it had no electrostatic charge including natural electric charge (in non-charged state). The collection efficiency of the non-charged particles having a particle diameter of 0.3 to 0.5 μm (hereinafter referred to as "collection efficiency with no charge") was measured by the method described in above (6). Using the values of the collection efficiency with no charge and collection efficiency after electric charge, the performance increase rate was calculated by the following equation.

Performance increase rate [%]=100×[ln(1−[collection efficiency after electric charge (%)]/100)]/[ln(1−[collection efficiency with no charge (%)]/100)]

(8) Collection Efficiency after Heat Treatment and Performance Retention Rate after Heat Treatment Each sheet sample after fluorine processing was subjected to an electric charging treatment, and thereafter subjected to heating (heat treatment) in an atmosphere of 80° C. for 30 minutes. The collection efficiency of the heat-treated particles having a particle diameter of 0.3 to 0.5 μm (hereinafter referred to as "collection efficiency after heat treatment") was measured by the method described in above (6). Using the values of the collection efficiency after electric charge in the above (7) and collection efficiency after heat treatment, the performance retention rate after heat treatment was calculated by the following equation.

Performance retention rate after heat treatment [%]=100×[ln(1−[collection efficiency after heat treatment (%)]/100)]/[ln(1−[collection efficiency after electric charge (%)]/100)]

Example 1-1

Polypropylene nonwoven fabrics obtained by a melt-blowing method and having a basis weight of 30 g/m$^2$, an average fiber diameter of 3 μm, and a thickness of 0.25 mm were stuck to a thermostat plate kept at 30° C. and placed on the ceiling of a reaction container made of cylindrical ceramic. A hot plate heated to 300° C. was placed on the bottom part and polytetrafluoroethylene prepared by mixing n-$C_{10}F_{22}$ and n-$C_{12}F_{26}$ in equal masses was transpired each from a metal board to give processed sheets having a deposition amount of 0.75 g/m$^2$.

Each of the obtained sheets was subjected to an aging treatment at 60° C. for 15 minutes, and then an electretization treatment was carried out by a corona discharge method and various kinds of evaluations were carried out. The results are shown in Table 1. Further, when a melting point of a nonwoven fabric sample in which PTFE was deposited on a surface was measured, two peaks at 36° C. and 76° C. derived from PTFE were determined.

Example 1-2

Treatments and various kinds of evaluations were carried out in the same manner as those in Example 1-1, except that polytetrafluoroethylene prepared by mixing n-$C_{12}F_{26}$ and n-$C_{14}F_{30}$ in equal masses was used in Example 1-1. The results are shown in Table 1. Further, when a melting point of a nonwoven fabric sample in which PTFE was deposited on a surface was measured, two peaks at 76° C. and 103° C. derived from PTFE were determined.

Example 1-3

Treatments and various kinds of evaluations were carried out in the same manner as those in Example 1-1, except that polytetrafluoroethylene prepared by mixing n-$C_{14}F_{30}$ and n-$C_{16}F_{34}$ in equal masses was used in Example 1-1. The results are shown in Table 1. Further, when a melting point of a nonwoven fabric sample in which PTFE was deposited on a surface was measured, two peaks at 103° C. and 125° C. derived from PTFE were determined.

Example 1-4

Treatments and various kinds of evaluations were carried out in the same manner as those in Example 1-3, except that the electretization treatment was carried out by penetrating a polypropylene nonwoven fabric with pure water in Example 1-3. The results are shown in Table 1. Further, when a melting point of a nonwoven fabric sample in which PTFE was deposited on a surface was measured, two peaks at 103° C. and 125° C. derived from PTFE were determined.

Example 1-5

Treatments and various kinds of evaluations were carried out in the same manner as those in Example 1-1, except that polytetrafluoroethylene prepared by mixing n-$C_{16}F_{34}$ and n-$C_{20}F_{42}$ in equal masses was used in Example 1-1. The results are shown in Table 1. Further, when a melting point of a nonwoven fabric sample in which PTFE was deposited on a surface was measured, two peaks at 125° C. and 167° C. derived from PTFE were determined.

Comparative Example 1-1

Perfluoroheptane in which polytetrafluoroethylene prepared by mixing n-$C_{10}F_{22}$ and n-$C_{12}F_{26}$ in equal masses was dissolved was made to infiltrate into polypropylene nonwoven fabrics obtained by a melt-blowing method and having a basis weight of 30 g/m$^2$, an average fiber diameter of 3 μm, and a thickness of 0.25 mm, and then the fabrics were dried at normal temperature to give processed sheets having a deposition amount of 0.75 g/m$^2$.

Each of the obtained sheets was subjected to oil repellency test by liquid droplets, and at the same time subjected to an electretization treatment by a corona discharge method, and various kinds of evaluations were carried out. The results are shown in Table 1. Further, when a melting point of a nonwoven fabric sample in which PTFE was deposited on a surface was measured, a broad peak at 56° C. derived from PTFE was determined.

Comparative Example 1-2

Treatments and various kinds of evaluations were carried out in the same manner as those in Comparative Example 1-1, except that polytetrafluoroethylene prepared by mixing n-$C_{12}F_{26}$ and n-$C_{14}F_{30}$ in equal masses was used in Comparative Example 1-1. The results are shown in Table 1. Further, when a melting point of a nonwoven fabric sample in which PTFE was deposited on a surface was measured, a broad peak at 89° C. derived from PTFE was determined.

Comparative Example 1-3

Treatments and various kinds of evaluations were carried out in the same manner as those in Comparative Example 1-1, except that polytetrafluoroethylene prepared by mixing n-$C_{14}F_{30}$ and n-$C_{16}F_{34}$ in equal masses was used in Comparative Example 1-1. The results are shown in Table 1. Further, when a melting point of a nonwoven fabric sample in which PTFE was deposited on a surface was measured, a broad peak at 114° C. derived from PTFE was determined.

Comparative Example 1-4

Treatments and various kinds of evaluations were carried out in the same manner as those in Comparative Example 1-3, except that the electretization treatment was carried out by penetrating a polypropylene nonwoven fabric with pure water. The results are shown in Table 1. Further, when a melting point of a nonwoven fabric sample in which PTFE was deposited on a surface was measured, a broad peak at 114° C. derived from PTFE was determined.

Comparative Example 1-5

Treatments and various kinds of evaluations were carried out in the same manner as those in Comparative Example 1-1, except that polytetrafluoroethylene prepared by mixing n-$C_{16}F_{34}$ and n-$C_{20}F_{42}$ in equal masses was used in Comparative Example 1-1. The results are shown in Table 1. Further, when a melting point of a nonwoven fabric sample in which PTFE was deposited on a surface was measured, a broad peak at 146° C. derived from PTFE was determined.

TABLE 1

| | Example 1-1 | Example 1-2 | Example 1-3 | Example 1-4 | Example 1-5 |
|---|---|---|---|---|---|
| Carrier | PP | PP | PP | PP | PP |
| Processing method | Vapor deposition | Vapor deposition | Vapor deposition | Vapor deposition | Vapor deposition |
| Polytetrafluoroethylene | Mixture with n-$C_{10}F_{22}$ and n-$C_{12}F_{26}$ | Mixture with n-$C_{12}F_{28}$ and n-$C_{14}F_{30}$ | Mixture with n-$C_{14}F_{30}$ and n-$C_{16}F_{34}$ | Mixture with n-$C_{14}F_{30}$ and n-$C_{16}F_{34}$ | Mixture with n-$C_{18}F_{34}$ and n-$C_{20}F_{42}$ |
| Deposition amount [g/m$^2$] | 0.75 | 0.75 | 0.75 | 0.75 | 0.75 |
| Electric charge method | Corona discharge | Corona discharge | Corona discharge | Contact with a liquid | Crona discharge |
| Oil repellency [mN/m] | 25.4 | 25.4 | 25.4 | 25.4 | 25.4 |
| AATCC118 [grade] | 7 | 7 | 6 | 6 | 6 |
| PAO penetration resistance | ○ | ○ | ○ | ○ | ○ |
| Tobacco smoke durability life [mg/sheet] | 34.5 | 34.1 | 33.3 | 37.7 | 32.0 |
| PAO durability life [mg/sheet] | 27.2 | 26.7 | 26.1 | 29.8 | 25.0 |
| Collection efficiency after electric charge [%] | 97.2 | 97.7 | 98.0 | 99.93 | 98.3 |
| Collection efficiency with no electric charge [%] | 31.9 | 32.4 | 32.1 | 32.0 | 32.0 |
| Performance increase rate [%] | 932.4 | 965.2 | 1006.0 | 1887.2 | 1051.0 |
| Collection efficiency after electric charge [%] | 97.6 | 98.0 | 97.9 | 99.94 | 98.1 |
| Collection efficiency after heat treatment [%] | 70.6 | 91.3 | 97.0 | 99.89 | 97.6 |
| Performance retention rate after heat treatment [%] | 33.0 | 62.3 | 90.8 | 91.8 | 94.2 |

| | Comparative Example 1-1 | Comparative Example 1-2 | Comparative Example 1-3 | Comparative Example 1-4 | Comparative Example 1-5 |
|---|---|---|---|---|---|
| Carrier | PP | PP | PP | PP | PP |
| Processing method | Solution | Solution | Solution | Solution | Solution |
| Polytetrafluoroethylene | Mixture with n-$C_{10}F_{22}$ and n-$C_{12}F_{26}$ | Mixture with n-$C_{12}F_{28}$ and n-$C_{14}F_{30}$ | Mixture with n-$C_{14}F_{30}$ and n-$C_{16}F_{34}$ | Mixture with n-$C_{14}F_{30}$ and n-$C_{16}F_{34}$ | Mixture with n-$C_{16}F_{34}$ and n-$C_{20}F_{42}$ |
| Deposition amount [g/m$^2$] | 0.75 | 0.75 | 0.75 | 0.75 | 0.75 |
| Electric charge method | Corona discharge | Corona discharge | Corona discharge | Contact with a liquid | Corona discharge |
| Oil repellency [mN/m] | 25.4 | 25.4 | 25.4 | 25.4 | 25.4 |
| AATCC118 [grade] | 6 | 6 | 5 | 5 | 5 |
| PAO penetration resistance | ○ | ○ | ○ | ○ | ○ |
| Tobacco smoke durability life [mg/sheet] | 32.9 | 32.1 | 30.9 | 35.2 | 30.0 |
| PAO durability life [mg/sheet] | 25.9 | 25.0 | 24.1 | 28.1 | 23.7 |
| Collection efficiency after electric charge [%] | 97.0 | 97.2 | 97.4 | 99.90 | 97.3 |
| Collection efficiency with no electric charge [%] | 30.8 | 30.4 | 31.4 | 31.5 | 32.0 |
| Performance increase rate [%] | 949.8 | 986.6 | 965.2 | 1825.8 | 936.5 |
| Collection efficiency after electric charge [%] | 96.9 | 97.3 | 97.2 | 99.92 | 97.4 |
| Collection efficiency after heat treatment [%] | 60.8 | 83.7 | 95.5 | 99.78 | 96.6 |
| Performance retention rate after heat treatment [%] | 27.0 | 50.5 | 86.9 | 85.8 | 92.3 |

Example 2

Examples of the above-mentioned second invention will be described hereinbelow. Testing methods will be described below.

(1) Thickness

The thickness of the nonwoven fabric was measured at a terminal diameter of 20 mm and a load of 7 g/cm² using a digital thickness gauge.

(2) Effective Fiber Diameter

The effective fiber diameter of the nonwoven fabric was calculated according to the method defined in Davies, C. N., "The Separation of Airborne Dust and Particles", Institution of Mechanical Engineers, London, Proceedings 1B, 1952.

(3) Fiber Surface Area

The fiber surface area (m²/m²) per 1 m² of the nonwoven fabric was calculated using the effective fiber diameter obtained in the above (2), basis weight of the nonwoven fabric, and density (specific gravity) obtained according to JIS K 0061.

(4) Grass Transition Temperature

The grass transition temperature of the particles was determined in accordance with JIS K 7121. Specifically, 10 mg of a sample was placed in a sealed pan for measurement, and a midpoint glass transition temperature measured using a differential scanning calorimeter manufactured by TA Instruments under conditions of a temperature raising rate of 20° C./min was determined as a glass transition temperature.

(5) Melting Point

The melting point of the particles was determined in accordance with JIS K 7121. Specifically, 5 mg of a sample was placed in a sealed pan for measurement, and a peak temperature measured with the sealed pan having air tightness using a differential scanning calorimeter manufactured by TA Instruments under conditions of a temperature raising rate of 10° C./min was determined as a melting point by confirming the existence of a recrystallization peak.

(6) Ventilation Resistance.

Each sample punched into 72 mm φ was attached to an adapter having an effective ventilation diameter of 50 mm φ, piping having an inner diameter of 50 mm where a microdifferential pressure gauge was connected was coupled vertically, ventilation was carried out at 12 L/min (5 cm/s), and ventilation resistance (pressure loss) was measured without throttling.

(7) Collection Efficiency (Initial Collection Efficiency) on Electretized Filter Each sample punched into 72 mm φ was attached to an adapter having an effective ventilation diameter of 50 mm φ, and a particle collection efficiency test was carried out with a filter by the following method using a light scattering type particle counter KC-01E manufactured by Rion Co., Ltd.

Evaluation particles: Airborne dust

Ventilation speed: 5 cm/sec (12 L/min)

Calculation of efficiency: The number of particles having particle diameters of 0.3 to 0.5 μm before and after passage through the filter was measured and a value obtained by calculating the following equation was defined as an initial collection efficiency.

Collection efficiency (%)=(1−(number of particles after passage through filter/number of particles before passage through filter))×100

(8) Initial QF Value

The initial QF value was calculated by the following equation using values of the ventilation resistance measured in the above (6) and the initial collection efficiency measured in the above (7).

Initial QF value $(mmAq^{-1})=-[\ln(1-[\text{initial collection efficiency }(\%)]/100)]/[\text{ventilation resistance }(mmAq)]$ (9) Durability to Oil Mist (Tobacco Smoke Collection Quantity)

A test of load resistance to oil mist (durability to oil mist) was carried out using tobacco smoke as composite particles containing various types of polar molecules.

[Tobacco Smoke Loading]

Four cigarettes of MEVIUS (registered trademark) manufactured by Japan Tobacco Inc., were burned in a 1 m³ acrylic container with a smoke filter by a technique according to JEM1467 method. A sample punched into 72 mm φ was attached to an adapter having an effective ventilation diameter of 50 mm φ, and ventilation was carried out at an air quantity of 12 L/min for 10 minutes. The particle concentration was decreased from 4000 CPM to 3000 CPM by a digital dust indicator P-2L manufactured by Sibata Scientific Technology Ltd. In the case where the efficiency was maintained at 100%, four cigarettes of MEVIUS (registered trademark) were burned and ventilation was carried out at an air quantity of 12 L/min for 10 minutes, so that the collection quantity was approximately 1 cigarette/cycle. The masses of the filter immediately before and immediately after a tobacco smoke loading cycle were weighed every time and the difference between the masses was determined as a collection quantity in the cycle. Of the collected components derived from tobacco smoke, a volatile component was dissipated during an elapsed time between the cycle tests and NaCl was deposited in the collection efficiency test at the time of tobacco smoke loading. However, a measurement error caused by these disadvantages was avoided. Then, the tobacco smoke loading cycle was repeated until the performance retention rate to be described later was less than 15%, and the cycle was ended at the moment when the performance retention rate became less than 15%. An integrated value of the collection quantity at the cycle immediately before the cycle in which the performance retention rate became less than 15% (at the end of two cycles, in the case where the performance retention rate was less than 15% at the end of two cycles) was determined as a tobacco smoke collection quantity.

[Measurement Method of Collection Efficiency at the Time of Tobacco Smoke Loading]

For each loading of the above-mentioned 1 cycle (four cigarettes of MEVIUS (registered trademark) were burned and ventilation was carried out at an air quantity of 12 L/min for 10 minutes), each sample punched into 72 mm φ was attached to an adapter having an effective ventilation diameter of 50 mm φ. Using Certitest Model 8130 manufactured by TSI Inc., the tobacco smoke collection quantity was calculated in each 1 cycle, the collection efficiency test (collection efficiency test at the time of tobacco smoke loading) described below was carried out, and the collection efficiency was calculated by the equation described in the above (7). The collection efficiency of particles having a particle diameter of 0.3 to 0.5 μm at the end of the cycle immediately before the cycle in which the performance retention rate became less than 15% (at the end of two cycles, in the case where the performance retention rate was less than 15% at the end of two cycles) was determined as a collection efficiency at the cycle end.

Evaluation particles: Solid NaCl (generated from 2% by mass of NaCl solution) in equilibrium charged state
Modal particle diameter 0.075 μm
Ventilation speed: 5 cm/sec (6 L/min)
Concentration: 200 mg/m$^3$
Calculation of efficiency: Evaluation of concentration before and after passage through the filter by a light scattering concentration method It was confirmed that the collection efficiency of particles having a particle diameter of 0.3 to 0.5 μm by a light scattering concentration method was almost coincident with the collection efficiency of those particles measured with a light scattering calculation device.

In the case where a sample after tobacco smoke loading was used, efficiency evaluation was carried out by a light scattering concentration method because a light scattering counter caused interference in the particle diameter measurement. Since the particle concentration did not reach equilibrium for 4 seconds by a conventional method, the value of 20 seconds was set as the time taken for the upper and lower detectors to be equilibrium, and the numerical value in the filter tester mode of 1 cycle (efficiency measurement mode) was employed.

(10) Tobacco Smoke Collection Quantity Per 1 m$^2$ of Fiber Surface Area

A tobacco smoke collection quantity per 1 m$^2$ of the filter was calculated by dividing the tobacco smoke collection quantity obtained in the above (9) by an adaptor passing area of 50 mm φ, and a tobacco smoke collection quantity per 1 m$^2$ of the fiber surface area was calculated by dividing the tobacco smoke collection quantity per 1 m$^2$ of the filter by the fiber surface area.

(11) Performance Retention Rate

The performance retention rate was calculated by the following equation using the values of the initial collection efficiency measured in the above (7) and the collection efficiency at the cycle end measured in the above (9).

Performance retention rate [%]=100×[ln(1−[collection efficiency at cycle end (%)]/100)]/[ln(1−[initial collection efficiency (%)]/100)]

(12) Filter Deterioration Rate

A performance retention rate was determined by the same method as the above equation (11) using the tobacco smoke collection quantity (integrated value) at the end of each cycle. Using the tobacco smoke collection quantity (integrated value) per 1 m$^2$ of the fiber surface area at the end of each cycle when the performance retention rate was in the range of 15 to 75% (at the end of one cycle in the case where the performance retention rate was less than 15% at the end of two cycles, and at the end of two cycles) and the performance retention rate, a semilogarithmic graph was plotted with the tobacco smoke deposited quantity (g/m$^2$) per 1 m$^2$ of the fiber surface area (ordinary axis) as abscissae and the performance retention rate (logarithmic axis) as ordinates. Then, an approximately straight line passing through a point where the tobacco smoke deposited quantity per 1 m$^2$ of the fiber surface area was 0 g/m$^2$ and the performance retention rate was 1 was obtained by a least-squares method. Regarding the logarithmic axis, an interval (for example, an interval between 0.1 and 1) where the performance retention rate was 10 times was determined as 1 (no unit), an inclination (unit: 1/(g/m$^2$)) of the above-mentioned approximately straight line was calculated, and the resulted value was determined as a filter deterioration rate. The semilogarithmic graph is shown in FIG. 1.

Example 2-1

A solution obtained by dissolving n-C$_{18}$F$_{38}$ (melting point of 149° C.) in perfluorohexane was prepared. Thereafter, polypropylene nonwoven fabrics obtained by a melt-blowing method were immersed in the above-mentioned solution and then dried to deposit particles in solids of 0.30 g/m$^2$ on the polypropylene nonwoven fabrics. Subsequently, the polypropylene nonwoven fabrics were electretized by a corona discharge method to produce an electret filter. The evaluation results of the filter thus obtained are shown in Table 2.

Example 2-2

Polypropylene nonwoven fabrics obtained by a melt-blowing method were stuck to a thermostat plate kept at 30° C. and placed on the ceiling of a reaction container made of cylindrical ceramic. A hot plate heated to 250° C. was placed on the bottom part and n-C$_{18}$F$_{38}$ (melting point of 149° C.) was transpired each from a metal board to deposit particles in solids of 0.30 g/m$^2$ on the polypropylene nonwoven fabrics. The polypropylene nonwoven fabrics where particles were deposited were subjected to an aging treatment at 60° C. for 15 minutes. Subsequently, the polypropylene nonwoven fabrics were electretized by a corona discharge method to produce an electret filter. The evaluation results of the filter thus obtained are shown in Table 2.

Example 2-3

Suspension polymerization was carried out to give a random copolymer (glass transition temperature of 81° C.) in which the mass ratio of dicyclopentanyl methacrylate to 2-(perfluorohexyl)ethylmethacrylate was 1:9. The above-mentioned random copolymer was pulverized in perfluorohexane to prepare a dispersion having a concentration of 1% by mass. The dispersion was made to infiltrate into polypropylene nonwoven fabrics, and a non-solved portion of the random copolymer particles previously dispersed was deposited on the nonwoven fabrics, followed by an aging treatment at 100° C. for 15 minutes. The deposited quantity of the random copolymer was 0.30 g/m$^2$ in solids. Subsequently, the polypropylene nonwoven fabrics were electretized by a corona discharge method to produce an electret filter. The evaluation results of the filter thus obtained are shown in Table 2.

Comparative Example 2-1

Polypropylene nonwoven fabrics obtained by a melt-blowing method were electrically charged by a corona discharge method to produce a filter, and the filter was used in various kinds of evaluations. The evaluation results of the filter thus obtained are shown in Table 2.

Comparative Example 2-2

Polypropylene nonwoven fabrics obtained by a melt-blowing method were immersed in ethyl alcohol to eliminate electrical charge, so that a filter was produced and then used in various kinds of evaluations. The evaluation results of the filter thus obtained are shown in Table 2.

It was found that the QF value was improved by the electretization treatment according to Examples 2-1 to 2-3 and Comparative Examples 2-1 and 2-2.

It was found that the electret filter having a fluorine-containing component on its surface had a small deterioration rate according to Examples 2-1 to 2-3 and Comparative Example 2-1.

It was found that the electret filter on which a fluorine-containing component was deposited by a vapor deposition method had smaller deterioration rate according to comparison of Example 2-2 with Example 2-1.

TABLE 2

|  | Example 2-1 | Example 2-2 | Example 2-3 | Comparative Example 2-1 | Comparative Example 2-2 |
|---|---|---|---|---|---|
| Basis weight [g/m$^2$] | 30.3 | 30.3 | 30.3 | 30 | 30 |
| Thickness [mm] | 0.23 | 0.23 | 0.23 | 0.23 | 0.24 |
| Ventilation resistance [mmAq] | 2.8 | 2.9 | 2.7 | 2.7 | 2.6 |
| Effective fiber diameter [μm] | 5.59 | 5.50 | 5.70 | 5.64 | 5.64 |
| Fiber surface area [m$^2$/m$^2$] | 23.8 | 24.2 | 23.4 | 23.4 | 23.4 |
| Initial collection efficiency [%] | 99.3 | 99.4 | 99.4 | 99.3 | 28.2 |
| Initial QF value [mmAq$^{-1}$] | 1.77 | 1.76 | 1.89 | 1.84 | 0.13 |
| Tobacco smoke collection quantity [mg/sheet] | 13.8 | 27.4 | 14.2 | 12.6 | 2.3 |
| Tobacco smoke collection quantity per 1 m$^2$ of fiber surface area [g/m$^2$] | 0.30 | 0.58 | 0.31 | 0.27 | 0.05 |
| Collection efficiency at cycle end [%] | 70.2 | 61.3 | 55.7 | 33 | 29.5 |
| Performance retention rate [—] | 0.24 | 0.19 | 0.16 | 0.08 | — |
| Filter deterioration rate [1/(g/m$^2$)] | −4.78 | −2.92 | −5.94 | −9.17 | — |

INDUSTRIAL APPLICABILITY

It is made possible to obtain an electret of the first invention excellent in oil repellency, oil mist resistance, electric charge stability, and performance retention rate after heat treatment without using PFOA, PFOS and analogous compounds thereof by simple apparatuses and processes, and a filter including the electret.

An electret filter of the second invention is preferably usable as, for example, dust respirators, various types of air conditioning elements, air cleaners, cabin filters, and filters aimed at protecting various types of apparatuses, and especially preferably usable for air cleaners that mainly collect tobacco smoke, air conditioning elements, or the like.

The invention claimed is:

1. An electret filter having a fluorine-containing component deposited on a fiber surface, wherein:
   the electret filter has an initial Quality Factor (QF) value of 0.05 Pa$^{-1}$ or more in collection efficiency of particles having a particle diameter of 0.3 to 0.5 μm at a wind speed of 5 cm/s, and a filter deterioration rate by tobacco smoke loading of −8/(g/m$^2$) or more, and
   the fluorine-containing component is at least one of a fluorine-containing polycyclic compound having a melting point of 100° C. or higher and a fluorine-containing polymer having a melting point or a glass transition temperature of 100° C. or higher.

2. The electret filter according to claim 1, wherein the fiber has an effective fiber diameter of 0.1 μm to 20 μm.

* * * * *